(12) United States Patent
Narayanan et al.

(10) Patent No.: US 8,074,014 B2
(45) Date of Patent: Dec. 6, 2011

(54) STORAGE SYSTEMS USING WRITE OFF-LOADING

(75) Inventors: Dushyanth Narayanan, Cambridge (GB); Austin Donnelly, Cambridge (GB); Antony Rowstron, Cambridge (GB); Sameh Elnikety, Cambridge (GB); Eno Thereska, Cambridge (GB)

(73) Assignee: Microsoft Corporation, Redmond, WA (US)

(*) Notice: Subject to any disclaimer, the term of this patent is extended or adjusted under 35 U.S.C. 154(b) by 532 days.

(21) Appl. No.: 12/059,695

(22) Filed: Mar. 31, 2008

(65) Prior Publication Data
US 2009/0249001 A1 Oct. 1, 2009

(51) Int. Cl.
G06F 13/00 (2006.01)
G06F 13/28 (2006.01)
G06F 1/00 (2006.01)

(52) U.S. Cl. .................... 711/112; 711/154; 713/324

(58) Field of Classification Search .............. 713/324; 711/154
See application file for complete search history.

(56) References Cited

U.S. PATENT DOCUMENTS

| | | | |
|---|---|---|---|
| 5,469,553 A | 11/1995 | Patrick | |
| 6,925,529 B2 | 8/2005 | Bohrer et al. | |
| 7,032,119 B2 | 4/2006 | Fung | |
| 7,035,972 B2 | 4/2006 | Guha et al. | |
| 7,043,650 B2 | 5/2006 | Bresniker et al. | |
| 7,092,943 B2 | 8/2006 | Roese et al. | |
| 7,093,149 B2 | 8/2006 | Tsirkel et al. | |
| 7,600,137 B2 | 10/2009 | Trappeniers et al. | |
| 7,673,161 B2 | 3/2010 | Freeman et al. | |
| 2002/0167952 A1 | 11/2002 | Watson et al. | |
| 2002/0177449 A1 | 11/2002 | McDonnell et al. | |
| 2003/0217299 A1 | 11/2003 | Neuman et al. | |
| 2004/0107273 A1 | 6/2004 | Biran et al. | |
| 2004/0230848 A1 | 11/2004 | Mayo et al. | |
| 2005/0044436 A1* | 2/2005 | Holle | 713/320 |
| 2005/0204027 A1 | 9/2005 | Claseman | |
| 2006/0171329 A1 | 8/2006 | Ying | |
| 2006/0251115 A1 | 11/2006 | Haque et al. | |
| 2007/0006174 A1* | 1/2007 | Sohm et al. | 717/131 |
| 2007/0011472 A1 | 1/2007 | Cheng | |
| 2007/0022121 A1* | 1/2007 | Bahar et al. | 707/10 |
| 2007/0079063 A1 | 4/2007 | Mizuno | |
| 2007/0136489 A1 | 6/2007 | Temoshenko et al. | |
| 2007/0150713 A1 | 6/2007 | Almeida et al. | |
| 2007/0162582 A1 | 7/2007 | Belali et al. | |

(Continued)

OTHER PUBLICATIONS

Abd-El-Malek, Courtright II, Cranor, Granger, Hendricks, Klosterman, Mesnier, Prasad, Salmon, Sambasivan, Sinnamohideen, Strunk, Thereska, Wachs, Wylie, "Ursa Minor: versatile cluster-based storage", retrieved on Dec. 30, 2009 at <<http://www.pdl.cmu.edu/PDL-FTP/SelfStar/ursaminor-fast05.pdf>>, USENIX Association, Proceedings of Conference on File and Storage Technology (FAST), Dec. 13, 2005, pp. 1-14.

(Continued)

Primary Examiner — Edward Dudek, Jr.
(74) Attorney, Agent, or Firm — Lee & Hayes, PLLC

(57) ABSTRACT

Improved storage systems which use write off-loading are described. When a request to store some data in a particular storage location is received, if the particular storage location is unavailable, the data is stored in an alternative location. In an embodiment, the particular storage location may be unavailable because it is powered down or because it is overloaded. The data stored in the alternative location may be subsequently recovered and written to the particular storage location once it becomes available.

20 Claims, 15 Drawing Sheets

U.S. PATENT DOCUMENTS

| | | | |
|---|---|---|---|
| 2008/0276016 A1* | 11/2008 | Fujibayashi | 710/36 |
| 2008/0276042 A1* | 11/2008 | Hetzler et al. | 711/114 |
| 2009/0063878 A1 | 3/2009 | Schmidt et al. | |
| 2009/0249001 A1 | 10/2009 | Narayanan et al. | |
| 2010/0023788 A1 | 1/2010 | Scott et al. | |
| 2010/0036834 A1 | 2/2010 | Bandas | |
| 2010/0106903 A1* | 4/2010 | Fujibayashi et al. | 711/112 |
| 2010/0169678 A1 | 7/2010 | Kozuka | |
| 2010/0257142 A1 | 10/2010 | Murphy et al. | |

OTHER PUBLICATIONS

Barroso, Holzle, "The Case for Energy-Proportional Computing", retrieved on Dec. 30, 2009 at <<http://www.cra.org/ccc/docs/ieee_computer07.pdf>>, IEEE Computer Society Press, vol. 40, No. 12, Dec. 2007, pp. 33-37.

Ghemawat, Gobioff, Leung, "The Google File System", retrieved on Dec. 30, 2009 at <<http://labs.google.com/papers/gfs-sosp2003.pdf>>, ACM SIGOPS Operating Systems Review (SOSP), vol. 37, No. 5, Oct. 19, 2003, pp. 29-43.

Hamilton, "Resource Consumption Shaping", retrieved on Dec. 31, 2009 at <<http://perspectives.mvdirona.com/2008/12/17/ResourceConsumptionShaping.aspx>>, Dec. 17, 2008, pp. 1-5.

Narayanan, Donnelly, Thereska, Elnikety, Rowstron, "Everest: Scaling down peak loads through I/O off-loading", retrieved on Dec. 30, 2009 at <<http://research.microsoft.com/pubs/68163/Everest-OSDI08.pdf>>, USENIX Association, Proceedings of OSDI, Dec. 2008, pp. 1-14.

Saito, Frolund, Veitch, Merchant, Spence, "FAB: Building Distributed Enterprise Disk Arrays from Commodity Components", retrieved on Dec. 30, 2010 at <<http://www.hpl.hp.com/research/ssp/papers/2004-10-ASPLOS-FAB.pdf>>, ACM SIGARCH Computer Architecture News (ASPLOS Conference), vol. 32, No. 5, Dec. 2004, pp. 48-58.

Schneider, "Implementing Fault-Tolerant Services Using the State Machine Approach: A Tutorial", retrieved on Dec. 30, 2010 at <<http://www.cs.cornell.edu/fbs/publications/SMSurvey.pdf>>, ACM Computing Surveys (CSUR), vol. 22, No. 4, Dec. 1990, pp. 299-319.

Thereska, Donnelly, Narayanan, "Sierra: a power-proportional, distributed storage system", retrieved on Feb. 24, 2010 at <<http://research.microsoft.com/pubs/112503/sierra-TR.pdf>>, Microsoft Corporation, Microsoft Tech Report MSR-TR-2009-153, Nov. 2009, pp. 1-15.

Wachs, Abd-El-Malek, Thereska, Ganger, "Argon: performance insulation for shared storage servers", retrieved on Dec. 30, 2009 at << http://www.pdl.cmu.edu/PDL-FTP/Storage/argon-fast07.pdf>>, USENIX Association, Conference on File and Storage Technologies (FAST), Supercedes Carnegie Mellon University Parallel Data Lab Technical Report CMU-PDL-06-106 (May 2006), Feb. 13, 2007, pp. 1-16.

Zhu, Zhou, "Power-Aware Storage Cache Management", retrieved on Dec. 30, 2009 at <<http://ieeexplore.ieee.org/stamp/stamp.jsp?arnumber=01407848>>, IEEE Computer Society, Transaction on Computers, vol. 54, No. 5, May 2005, pp. 587-602.

DataDirect Networks <<http://www.datadirectnet.com>>, pp. 3.

"Advanced Power Management", COPAN Systems, copyright 2007, retrieved on Jan. 14, 2008, at <<http://www.copansystems.com/products/power_managed_raid.php>>, pp. 1-2.

Anderson, et al., "Serverless Network File Systems". ACM Transactions on Computer Systems (TOCS), Feb. 1996, 1995, pp. 1-21.

Aranya, et al., "Tracefs A File System to Trace Them All". In Proceedings of the Third USENIX Conference on File and Storage Technologies (FAST 2004), Mar. 31-Apr. 2, 2004, San Francisco, CA USA, pp. 15.

Baker, et al., "Measurements of a Distributed File System ", ACM SIGOPS Operating Systems Review, vol. 25, Issue 5, Oct. 1991, pp. 198-212.

Baker, et al., "Non-Volatile Memory for Fast, Reliable File Systems". In Proc. International Conference on Architectural Support for Programming Languages and Operating Systems (ASPLOS Sep. 1992), pp. 1-13.

Battles, et al., "Reducing Data Center Power Consumption through Efficient Storage",<<http://www.netapp.com/ftp/wp-reducing-datacenter-power-consumption.pdf>> Network Appliance, Inc., copyright 2007, pp. 8.

Carrera, et al., "Conserving Disk energy in network servers", ACM, Proceedings of the 17th Annual International Conference on Supercomputing, Jun. 23-29, 2003, San Francisco, CA, USA, pp. 12.

Chase, et al., "Managing energy and server resources in hosting centers", ACM SIGOPS Operating Systems Review, vol. 35, Issue 5, Dec. 2001, pp. 14.

"Cheetah 10K.7" Data Sheet, Seagate Technology LLC, copyright 2004, available at <<http://www.seagate.com/docs/pdf/datasheet/disc/ds_cheetah10k.7.pdf>> as early as Apr. 1, 2005, pp. 2.

Colarelli, et al.,"Massive Arrays of Idle Disks for Storage Archives". Proceedings of the 2002 ACM/IEEE conference on Supercomputing, Nov. 16-22, 2002, pp. 11.

Dahlin, et al.,"Cooperative Caching: Using Remote Client Memory to Improve File System Performance". In Proc. Symposium on Operating Systems Design and Implementation, Nov. 14-17, 1994, Monterey CA, USA, pp. 14.

DeCandia, et al., "Dynamo: Amazon's Highly Available Key-value Store", retrieved on Dec. 30, 2009 at <<http://s3.amazonaws.com/AllThingsDistributed/sosp/amazon-dynamo-sosp2007.pdf>>, Operating Systems Review, Proceedings of Twenty-first ACM, SIGOPS symposium on Operating Systems Principles (SOSP), vol. 41, No. 6, Oct. 14-17, 2007, pp. 205-220.

Ellard, et al., "Passive NFS Tracing of Email and Research Workloads". In Proc. USENIX Conference on File and Storage Technologies (FAST 2003), Apr. 1, 2003, pp. 23.

Ganesh, et al.,"Optimizing Power Consumption in Large Scale Storage Systems", <<http://www.cs.cornell.edu/projects/quicksilver/public_pdfs/Ifs07.pdf>>, Proceedings of the 11th USENIX workshop on Hot topics in operating systems, May 7-9, 2007, San Diego, CA, USA, pp. 6.

Gurumurthi, et al.,"DRPM Dynamic Speed Control for Power Management in Server Class Disks". In Proc. International Symposium on Computer Architecture (ISCA 2003), San Diego, Jun. 9-11, 2003, pp. 11.

Gurumurthi, et al., "Interplay of Energy and Performance for Disk Arrays Running Transaction Processing Workloads", 2003 IEEE International Symposium on Performance Analysis of Systems and Software, Mar. 6-8, 2003, pp. 10.

"Intel Corporation, Dual-Core Intel R Xeon R Processor", Intel Corporation , May 2006, pp. 104.

Jiang, et al., "Enabling Autonomic Power-Aware Management of Instrumented Data Centers", retrieved on Dec. 30, 2009 at <<http://ieeexplore.ieee.org/stamp/stamp.jsp?arnumber=05160976>>, IEEE Computer Society, Proceedings of Symposium on Parallel and Distributed Processing (IPDPS), May 23-29, 2009, pp. 1-8.

Joukov, et al.,"Accurate and Efficient Replaying of File System Traces". Proceedings of the 4th conference on USENIX Conference on File and Storage Technologies—vol. 4, Dec. 13-16, 2005, pp. 14.

Kim, et al., "Power Management in Disk Storage System with Multiple RPM Levels", available as early as Jan. 13, 2006, at<<www.research.ibm.com/aceed/2005/posters/kim-abstract.pdf>>, pp. 1.

Krishnan, et al., "Thwarting the power-hungry disk", Proceedings of the USENIX Winter 1994 Technical Conference on USENIX , Winter 1994 Technical Conference, Jan. 17-21, pp. 15.

Li, et al., "EERAID Energy Efficient Redundant and Inexpensive Disk Arrays". 11th ACM SIGOPS European Workshop, Sep. 19-22, 2004, Leuven, Belgium, pp. 1-14.

"Managing Enterprise Storage", available as early as Dec. 16, 2007, at <<http://www.informationweek.com/news/showArticle.jhtml?articleID=202404374>>, pp. 1-4.

"Microsoft. Event tracing" Build date: Aug. 7, 2008, <http://msdn.microsoft.com/en-gb/library/bb968803(VS.85).aspx>> retreived from the internet on Aug. 12, 2008, 1 page.

"NAND Flash-Based Solid State Disk" Standard Type Product Data sheet, Version 1.31, Jan. 2007, Samsung Electronics, pp. 1-62.

Narayanan, et al., "Write Off-Loading Practical Power Management for Enterprise Storage", In Proc. USENIX Conference on File and Storage Technologies (FAST), pp. 256-267, San Jose, CA, Feb. 2008, pp. 15.

News release—Study: HP Data Center Management Solution Reduces Costs by 34 Percent at <<http://www.hp.com/hpinfo/newsroom/press/2007/070625xa.html>>, Jun. 25, 2007, Palo Alto, CA, pp. 1-3.

Nightingale, et al., "Energy-efficiency and storage flexibility in the blue file system", Proceedings of the 6th Conference on Symposium on Operating Systems Design & Implementation, Dec. 6-8, 2004, San Francisco, CA, 16 pages.

Pinheiro, et al., "Energy Conservation Techniques for Disk Array-Based Servers". ACM, Proceedings of the 18th Annual International cConference on Supercomputing, Jun. 26-Jul. 1, 2004, Malo, France, pp. 11.

Pinheiro, et al., "Failure Trends in a Large Disk Drive Population". In Proc. USENIX Conference on File and Storage Technologies (FAST2007), Feb. 13-16, 2007, San Jose, CA, pp. 13.

Yao, et al., "RIMAC A Novel Redundancy Based Hierarchical Cache Architecture for Energy Efficient, High Performance Storage Systems". Proceedings of the 1st ACM SIGOPS/EuroSys European Conference on Computer Systems 2006, Apr. 18-21, 2006, Beuven, Belgium, pp. 14.

Rosenblum, et al., "The Design and Implementation of a Log-Structured File System". ACM Transactions on Computer Systems (TOCS), Feb. 1992, pp. 1-15.

Ruemmler, et al., "UNIX Disk Access Patterns". In Proc. USENIX Winter 1993 Technical Conference, Jan. 1993, San Diego, CA pp. 17.

"SanDisk SSD UATA 5000 1.8", San Disk Corporation, Feb. 2007, pp. 35.

Schroeder et al.,"Disk Failures In The Real World: What Does an MTTF of 1,000,000 Hours Mean to You?" In Proc. USENIX Conference on File and Storage Technologies (FAST2007), Feb. 14-16, 2007, San Jose, CA, pp. 17.

Seltzer, et al., "An Implementation of a Log-Structured File System for UNIX". In Proc. USENIX Winter 1993 Conference, Jan., 1993, pp. 20.

"SNIA IOTTA Repository", retrieved on Dec. 31, 2010 at <<http://iotta.snia.org/>>, Storage Networking Industry Association, 2008, pp. 1-3.

van Renesse, et al., "Chain Replication for Supporting High Throughput and Availability", retrieved on Dec. 30, 20009 at <<http://www.cs.cornell.edu/home/rvr/papers/osdi04.pdf>>, USENIX Association, Proceedings of the 6th Conference on Symposium on Opearting Systems Design and Implementation (OSDI), vol. 4, Dec. 5, 2004, San Francisco, CA, pp. 91-104.

Weddle, et al., "PARAID The Gearshifting Power-Aware RAID". In Proc. USENIX Conference on File and Storage Technologies (FAST 2007), Feb. 13-16, 2007, San Jose, CA, pp. 16.

"Windows Azure Platform", retrieved on Dec. 31, 2010 at <<http://www.microsoft.com/windowsazure/>>, Dec. 2009, pp. 1-2.

Zedlewski, et al., "Modeling harddisk power consumption", available as early as Mar. 15, 2005 at <<http://www.cs.princeton.edu/~rywang/papers/fast03/dempsey.pdf>>, pp. 14.

Zhu, et al.,"Hibernator: Helping Disk Arrays Sleep Through the Winter". ACM Symposium on Operating Systems Principles, Proceedings of the 20th ACM Symposium on Operating Systems Principles, Oct. 23-26, 2005, Brighton, United Kingdom, pp. 14.

Zhu, et al., "Power-Aware Storage Cache Management". IEEE, May 2005, pp. 35.

Zhu, et al., "TBBT Scalable and Accurate Trace Replay for File Server Evaluation". SIGMETRICS'05, Jun. 6-10, 2005, Banff, Alberta, Canada, pp. 2.

U.S. Appl. No. 11/945,104, filed on Nov. 26, 2007, Stephen Hodges, Yuvraj Agarwal, Paramvir Bahl, Ranveer Chandra, Scott James, "Low-Power Operation of Networked Devices". 35 pages.

U.S. Appl. No. 12/714,223, filed on Feb. 26, 2010, Eno Thereska, Austin Donnelly, Dushyanth Naraynanan, "Reducing Power Consumption of Distributed Storage Systems". 58 pages.

"Active Notifications White Paper", Microsoft Corporation, Nov. 2006, pp. 16.

Agarwal, et al., "Dynamic Power Management using On Demand Paging for Networked Embedded Systems", IEEE, 2005, pp. 755-759.

Agarwal, et al., "On Demand Paging Using Bluetooth Radios on 802.11 Based Networks", CECS, Jul. 2003, pp. 19.

Agarwal, et al., "Somniloquy: Augmenting Network Interfaces to Reduce PC Energy Usage", retrieved on Nov. 22, 2010 at <<http://research.microsoft.com/pubs/79419/agarwal-NSD109-Somniloquy.pdf>>, USENIX Association, Proceedings of Symposium on Networked Systems Design and Implementation (NSDI), Boston, Massachusetts, Apr. 2009, pp. 365-380.

Agarwal et al., "Somniloquy: Maintaining Network Connectivity While Your Computer Sleeps", Mircosoft Research MSR-TR-2008-42, Mar. 2008 pp#1-pp#14.

Agarwal, et al., "Wireless Wakeups Revisited: Energy Management for VoIP over Wi-Fi Smartphones", ACM, 2007, pp. 14.

Allman, et al., "Enabling an Energy-Efficient Future Internet Through Selectively Connected End Systems", ACM SIGCOMM HotNets, 2007, pp. 1-7.

Anand, et al., "SelfTuning Wireless Network Power Management", ACM MobiCom 2003 (1581137532/03/0009), 2003, pp. 176-189.

"Autonomous Mode Operation for Marvell USB 8388", retrieved on Sep. 27, 2007, at <<http://dev.laptop.org/ticket/1060.>>, pp. 5.

Benini, et al., "A Survey of Design Techniques for System-Level Dynamic Power Management", IEEE VLSI Transactions (1063 8210/00), vol. 8, No. 3, 2000, pp. 299-316.

Borisov, et al., "Generic Application-Level Protocol Analyzer and its Language", Microsoft Research, MSR-TR-2005-133, 2005, pp. 1-15.

"Cell2Notify: Caller ID Based Notifications on Smartphones", at <<http://research.microsoft.com/netres/projects/cell2notify/>>, Microsoft Corporation, 2007, pp. 1.

Decker, "Requirements for a Location-Based Access Control Model", retrieved on Aug. 26, 2010 at <<http://delivery.acm.org/10.1145/1500000/1497259/p346-decker.pdf?key1=1497259&key2=2653182821&coll=GUIDE&dl=GUIDE&CFID=101946902&CFTOKEN=51824440>>, ACM, Proceedings of Intl Conference on Advances in Mobile Computing and Multimedia (MoMM), Linz, Austria, Nov. 2008, pp. 346-349.

Douglis, et al., "Thwarting the Power-Hungry Disk", USENIX Winter Technical Conference, 1994, pp. 292-306.

"Dropbox—Online backup, file sync, and sharing made easy", retrieved on Apr. 4, 2011 at <<https://www.dropbox.com>>, Dropbox, 2011, pp. 1.

Flautner, "Automatic Performance Setting for Dynamic Voltage Scaling", MobiCom 2001, 2001, pp. 260-271.

Flinn, et al., "Managing Battery Lifetime with Energy-Aware Adaptation", ACM Transactions on Computer Systems, vol. 22, No. 2, 2004, pp. 137-179.

Gashti, et al., "An UPnP-based context-aware framework for ubiquitous mesh home networks", retrieved on Nov. 22, 2010 at <<http://ieeexplore.ieee.org/stamp/stamp.jsp?arnumber=05449966>>, IEEE Intl Symposium on Personal, Indoor and Mobile Radio Communications (PIMRC), Tokyo, Japan, Sep. 2009, pp. 400-404.

Gibson, et al., "A Cost-Effective, High-Bandwidth Storage Architecture", retrieved on Nov. 22, 2010 at <<http://www.pdl.cmu.edu/ftp/NASD/asplos98.pdf>>, ACM, Proceedings of Conference on Architectural Support for Programming Languages and Operating Systems (ASPLOS), San Jose, California, Oct. 1998, pp. 92-103.

Gobioff, "Security for a High Performance Commodity Storage Subsystem", retrieved on Aug. 26, 2010 at <21 http://www.pdl.cmu.edu/PDL-FTP/NASA/hbg_thesis.pdf>>, Carnegie Mellon University, School of Computer Science, Doctoral Thesis, Jul. 1999, pp. 1-222.

Gunaratne, et al., "Managing energy consumption costs in desktop PCs and LAN switches with proxying, split TCP connections, and scaling of link speed", John Wiley & Sons, Ltd.: International Journal of Network Management, vol. 15, No. 5, 2005, pp. 297-310.

Gupta, et al., "Greening of the internet", ACM SIGCOMM 2003 (1-58113-735-4/03/0008), 2003, pp. 19-26.

Huang, et al., "Design and Implementation of Power-Aware Virtual Memory", USENIX Annual Technical Conference, 2003, pp. 57-70.

Hunt, et al., "Detours: Binary Interception of Win32 Functions", retrieved on Nov. 22, 2010 at <<http://research.microsoft.com/pubs/68568/huntusenixnt99.pdf>>, Usenix Association, Proceedings of Windows NT Symposium (WINSYM). Seattle, Washington, vol. 3, Jul. 1999, pp. 1-9.

"Industry Report—Digital Lifestyles: 2010 Outlook", retrieved on Apr. 4, 2011 at <<http://www.parksassociates.com/report/digital-lifestyles-2010-outlook>>, Parks Associates, 2010, pp. 1-2.

"Industry Report—Home Networks for Consumer Electronics", retrieved on Apr. 4, 2011 at <<http://www.parksassociates.com/report/home-networks-for-consumer-electronics>>, Parks Associates, 2009, pp. 1-4.

"Intel Centrino Mobile Technology Wake on Wireless LAN (WoWLAN) Feature", Intel Corporation, 2006, pp. 6.

Kistler, et al., "Disconnected Operation in the Coda File System", retrieved on Nov. 22, 2010 at <<http://www.cs.cmu.edu/~coda/docdir/s13.pdf>>, ACM Transactions on Computer Systems, vol. 10, No. 1, Feb. 1992, pp. 3-25.

Kotsovinos, et al., "replic8: Location-aware data replication for high availability in ubiquitous environments", retrieved on Aug. 26, 2010 at <<http://www.kotsovinos.com/research/papers/replic8.pdf>>, Springer-Verlag Berlin, LNCS vol. 3510, Proceedings of Intl Conference on Wired/Wireless Internet Communications (WWIC), Xanthi, Greece, May 2005, pp. 32-41.

Kravets, et al., "Application-Driven Power Management for Mobile Communication", Wireless Networks, vol. 6, No. 4, 2000, pp. 263-277.

Kumar, et al., "Single-ISA Heterogeneous Multi-Core Architectures: The Potential for Processor Power Reduction", Proceedings of the 36th International Symposium on Microarchitecture, Dec. 2003, pp. 12.

Mayo, et al., "Energy Consumption in Mobile Devices: Why Future Systems Need Requirements-Aware Energy Scale-Down", Hewlett-Packard Company, 2003, pp. 10.

Mazurek, et al., "Access Control for Home Data Sharing: Attitudes, Needs and Practices", retrieved on Nov. 22, 2010 at <<http://lorrie.cranor.org/pubs/chi2010-access-control.pdf>>, ACM, Proceedings of Intl Conference on Human Factors in Computing Systems (CHI), Atlanta, Georgia, Apr. 2010, pp. 645-654.

Mishra, et al., "Wake-on-WLAN", ACM, 2006, pp. 9.

Mogul, "TCP offload is a dumb idea whose time has come", IEEE HotOS, vol. 9, 2003, pp. 25-30.

Olsen, et al., "Multi-Processor Computer System Having Low Power Consumption", Springer-Verlag Berlin Heidelberg, 2003, pp. 53-67.

Ellard, et al., "Passive NFS Tracing of Email and Research Workloads". In Proc. USENIX Conference on File and Storage Technologies (FAST 2003), 2003, pp. 23.

Pering, et al., "CoolSpots: Reducing the Power Consumption of Wireless Mobile Devices with Multiple Radio Interfaces", ACM, 2006, pp. 220-232.

Pering, et al., "Exploiting Radio Hierarchies for Power-Efficient Wireless Device Discovery and Connection Setup", IEEE, 2005, pp. 6.

"Physically Connecting to a Network or Broadband Modem", at <<http://support.dell.com/support/edocs/system/latd820/en/ug/network.htl>>, Dell, 2007, pp. 12.

Ramasubramanian, et al., "Cimbiosys: A Platform for Content-Based Partial Replication", retrieved on Nov. 22, 2010 at <<http://research.microsoft.com/pubs/56258/tr-2008-116.pdf>>, USENIX Association, Proceedings of Symposium on Networked Systems Design and Implementation (NSDI), Boston, Massachusetts, Apr. 2009, pp. 261-276.

Ray, et al., "A Spatio-Temporal Role-Based Access Control Model", retrieved on Aug. 26, 2010 at <<http://citeseerx.ist.psu.edu/viewdoc/download?doi=10.1.1.160.3506&rep=rep1&type=pdf>>, Springer-Verlag Berlin, Proceedings of Conference on Data and Applications Security, Redondo Beach, California, 2007, pp. 211-226.

Rodden, et al., "Best of Both Worlds: Improving Gmail Labels with the Affordances of Folders", retrieved on Nov. 22, 2010 at <<http://static.googleusercontent.com/external_content/untrusted_dlcp/www.google.com/en/us/research/pubs/archive/36334.pdf>>, ACM, Proceedings of Intl Conference on Human Factors in Computing Systems (CHI), Atlanta, Georgia, Apr. 2010, pp. 4587-4596.

Sabhanatarajan, et al., "Smart-NICs: Power Proxying for Reduced Power Consumption in Network Edge Devices", IEEE ISVLSI 2008, 2008, pp. 75-80.

Salmon, et al., "Perspective: Semantic data management for the home", retrieved on Nov. 22, 2010 at <<http://www.pdl.cmu.edu/PDL-FTP/Storage/salmon-fast09.pdf>>, USENIX Association, Proceedings of Conference on File and Storage Technologies (FAST), San Francisco, California, Feb. 2009, pp. 167-182.

Seltzer, et al., "Hierarchical File Systems are Dead", retrieved on Nov. 22, 2010 at <<http://www.usenix.org/event/hotos09/tech/full_papers/seltzer/seltzer.pdf>>, USENIX Association, Proceedings of Conference on Hot Topics in Operating Systems (HotOS), Monte Verita, Switzerland, May 2009, pp. 1-5.

Shih, et al., "Wake on Wireless: An Event Driven Energy Saving Strategy for Battery Operated Devices", ACM, 2002, pp. 12.

Simunic, et al., "Dynamic Power Management for Portable Systems", ACM MobiCom 2000, 2000, pp. 11-19.

Sobti, et al., "Segank: A Distributed Mobile Storage System", retrieved on Nov. 2, 2010 at <<http://www.cs.princeton.edu/~rywang/papers/fast04/segank.pdf>>, USENIX Association, Proceedings of Conference on File and Storage Technologies (FAST), San Francisco, California, 2004, pp. 239-252.

Strauss, et al., "Device Transparency: A New Model for Mobile Storage", retrievd on Nov. 22, 2010 at <<http://pdos.csail.mit.edu/papers/eyo-hotstorage09.pdf>>, ACM SIGOPS Operating Systems Review, vol. 44, No. 1, Jan. 2010, pp. 5-9.

Stuedi, et al., "WhereStore: Location-based Data Storage for Mobile Devices Interacting with the Cloud", retrieved on Aug. 26, 2010 at <<http://delivery.acm.org/10.1145/1820000/1810932/a1-stuedi.pdf?key1=1810932&key2=9748082821&coll=GUIDE&dl=GUIDE&CFID=101936225&CFTOKEN=37599229>>, ACM, Proceedings of Workshop on Mobile Cloud Computing and Services: Social Networks and Beyond (MCS), San Francisco, California, Jun. 2010, pp. 1-8.

"TCP Offload Engine", retrieved on Mar. 7, 2008 at <<http://en.wikipedia.org/wiki/TCP_Offload_Engine, Wikipedia, 2008, pp. 1-5.

Terry, et al., "Managing Update Conflicts in Bayou, a Weakly Connected Replicated Storage System", retrieved on Nov. 22, 2010 at <<http://citeseerx.ist.psu.edu/viewdoc/download;jsessionid=C655550F24E44FE98C6D7041A8AD77CA?doi=10.1.1.12.7323&rep=rep1&type=pdf>>, ACM, Proceedings of Symposium on Operating Systems Principles (SOSP), Copper Mountain Resort, Colorado, Dec. 1995, pp. 172-183.

"Toshiba Leading Innovation", at <<http://www.toshibadirect.com/td/b2c/ebtext.to?page=r400_micro_f>>, 2007, pp. 2.

Wang, et al., "LOCK: A Highly Accurate, Easy-to-Use Location-based Access Control System", retrieved on Aug. 26, 2010 at <<http://itcs.tsinghua.edu.cn/~yongcai/data/LOCK_of_LoCA09.pdf>>, Springer-Verlag Berlin, LNCS vol. 5561, Proceedings of Location and Context Awareness (LoCA), Tokyo Japan, 2009, pp. 254-270.

Whitehead, "Welcome to WebDAV Resources", retrieved on Apr. 4, 2011 at <<http://www.webdav.org>>, Apr. 2010, pp. 1-4.

"Windows live sync", retrieved on Apr. 4, 2011 at <<http://sync.live.com>>, Microsoft Corporation, 2011, pp. 1.

Yang, et al., "On Effective Offloading Services for Resource-Constrained Mobile Devices Running Heavier Mobile Internet Applications", retrieved on Nov. 22, 2010 at <<http://awin.cs.ccu.edu.tw/magazine/IEEE_com/2008/002.pdf>>, IEEE Communications Magazine, Jan. 2008, pp. 56-61.

Bahl, et al., "Wake on Wireless —a Case for Multi Radio Wireless LAN", Microsoft Research, Apr. 4, 2002, pp. 47.

Sorber, et al., "Turducken: Hierarchical Power Management for Mobile Device", In Proceedings of the 3rd International Conference on Mobile Systems, Applications, and Services (MobiSys '05), Jun. 2005, Seattle, Washington, pp. 14.

* cited by examiner

Logger data structures

Manager data structures

STORAGE SYSTEMS USING WRITE OFF-LOADING

BACKGROUND

Enterprise data centers have a high power consumption which limits the density of servers and increases the total cost of ownership. Power management features have been introduced for server CPUs (central processing units) which provide low power states and dynamic clock and voltage scaling and reduce power consumption significantly during periods when the CPU is idle. There is no such advanced power management, however, for the storage sub-system of a data center and as a result storage uses a significant fraction of the power budget. In an example, a typical enterprise grade disk consumes 12 W even when idle, compared to 24 W for a dual-core processor. As servers typically have many disks, the power consumption due to storage exceeds that of the processors.

The embodiments described below are not limited to implementations which solve any or all of the disadvantages of known data centers and their storage sub-systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Improved storage systems which use write off-loading are described. When a request to store some data in a particular storage location is received, if the particular storage location is unavailable, the data is stored in an alternative location. In an embodiment, the particular storage location may be unavailable because it is powered down or because it is overloaded. The data stored in the alternative location may be subsequently recovered and written to the particular storage location once it becomes available.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Saving power in storage systems is difficult. Simply buying fewer disks is usually not an option, since this would reduce peak performance and/or capacity. The alternative is to spin down disks when they are not in use, but the traditional view is that idle periods in server workloads are too short for this to be effective.

Figure 1:
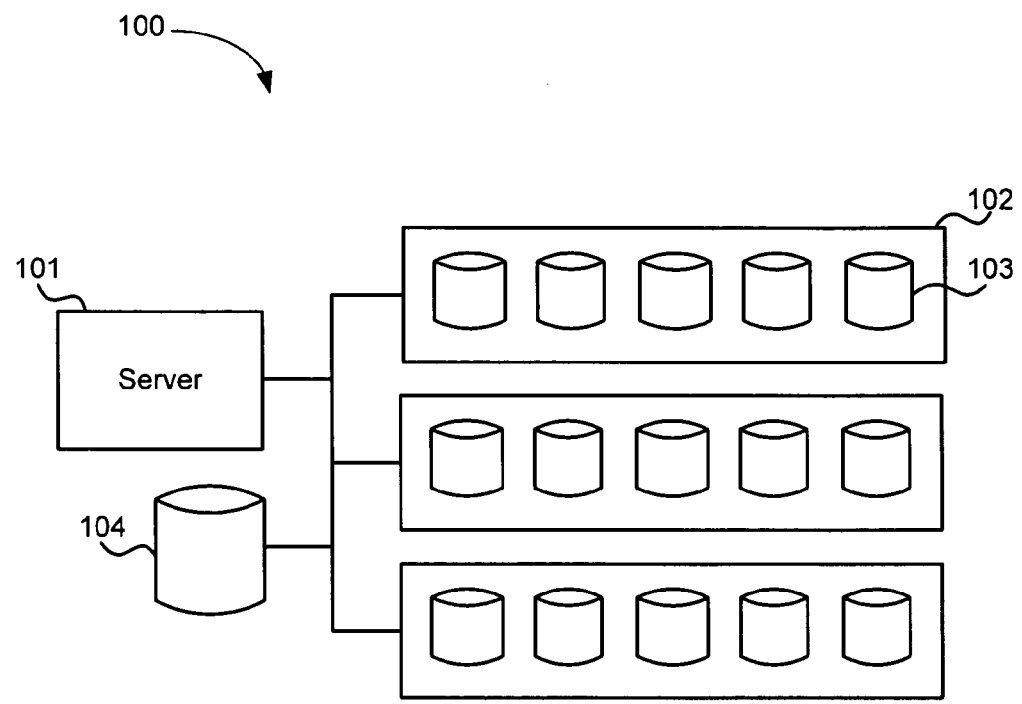
FIG. 1 is a schematic diagram of a storage system.

FIG. 1 is a schematic diagram of a storage system 100, as may be used in an enterprise data center. The system 100 comprises a server 101 which is attached to a number of storage elements 102, 103, 104. Typically, a server is connected to volumes 102 of disks 103 which may be configured as RAID (redundant array of independent disks) arrays. The system 100 may also comprise other types of storage 104, such as NVRAM (non-volatile random access memory) or solid-state memory such as flash memory.

Figure 2:
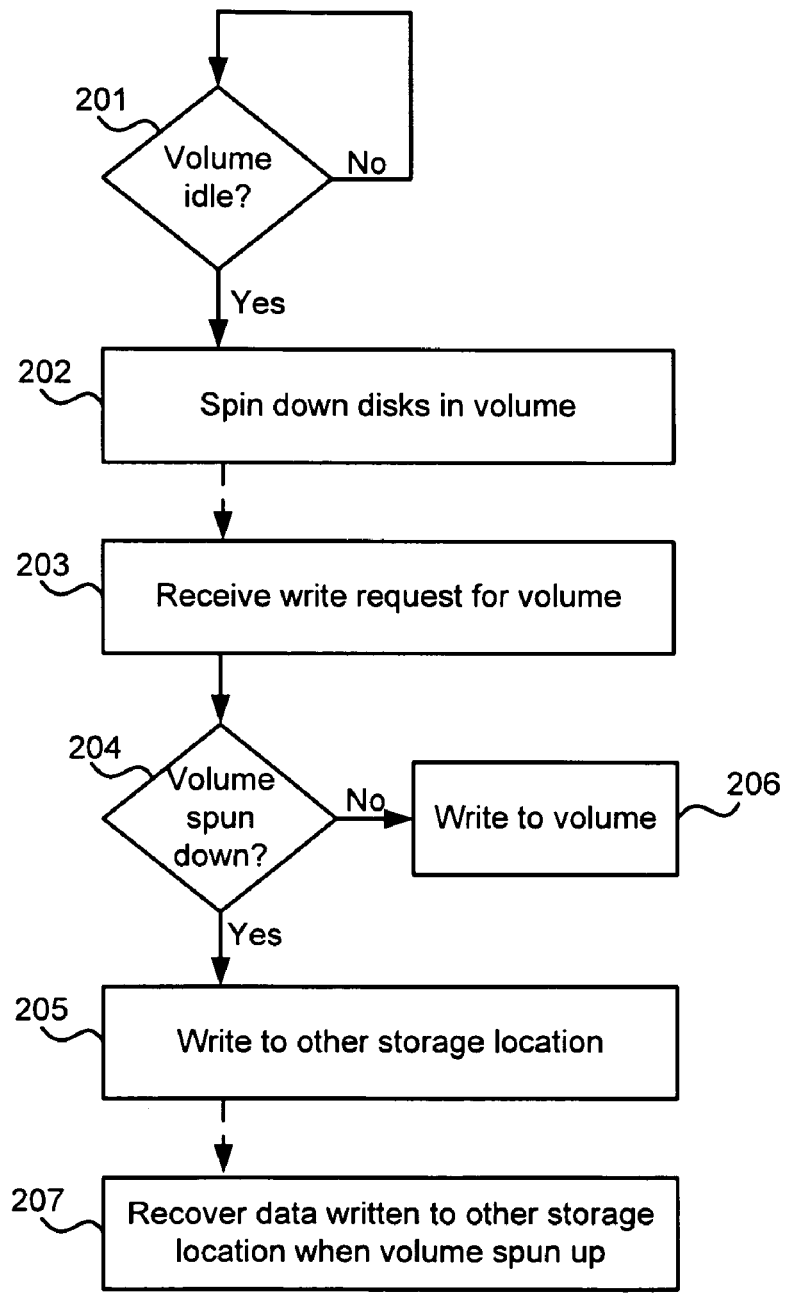
FIG. 2 is a flow diagram of an example method of operation of a storage system.

FIG. 2 is a flow diagram of an example method of operation of a storage system, such as that shown in FIG. 1. The system monitors volumes of disks (block 201) and when the length of time that a volume has been idle exceeds a threshold, the disks 103 in the volume 102 are powered down (block 202). This flow diagram uses volumes of disks by way of example only, other examples may monitor at different levels of granularity (e.g. on a per-disk basis) and/or may use different types of storage (e.g. NVRAM or solid-state memory).

Analysis of block-level traces of storage volumes in an enterprise data center shows that significant idle periods do exist. Traces were gathered from servers providing typical enterprise services, such as file servers, web servers, web caches, etc. Experimental results, in which the threshold (as in block 1002) was set at 60 seconds, demonstrated 28-36% saving in energy.

The method of operation (as shown in FIG. 2), may further comprise re-directing writes which are received in relation to volumes which have been spun down to other storage elsewhere in the storage system, such as another volume 102 or a different type of memory 104 or any other available storage in the storage system. In most examples the writes are re-directed to other persistent storage.

When a write request is received for a volume (block 203), if the volume has been spun down (in block 202, resulting in 'Yes' in block 204), the data is written (or 'off-loaded') to another storage location (block 205). However, if the volume has not been spun down ('No' in block 204), the data is written to the volume (block 206). Where data is off-loaded (in block 205), the data is subsequently recovered from where it was written and written to the correct volume (block 207). The volume where data is originally intended to be stored (as detailed in the request in block 203) may be referred to as the 'home volume'.

The volume(s) which have been powered down (in block 202) may be powered up periodically and/or on receipt of a read request for data stored on the spun down volume. They may also be powered up (i.e. spun up, the disk example), if they are unable to off-load a write for any reason or if they have reached a limit set on the amount of off-loaded data. Spinning up a volume takes time (e.g. up to 10-15 seconds), although the delay may differ between different storage technologies, and this introduces a latency where it is performed in response to receipt of a read request; however experimental results show that this occurs only rarely (e.g. that the performance of all write requests and 99% of read requests are not degraded). For some applications a large delay (e.g. 10-15 seconds) may be unacceptable even if rare and in some examples, write off-loading may not be enabled on the volumes that these applications use.

Whilst main-memory caches can be effective at absorbing reads, they tend to be less effective at absorbing writes. Most workloads do not exhibit high rates of over-writes in memory, hence most writes have to go to disk. As a result, there are periods in storage systems where all the traffic is write traffic. By using a method such as that shown in FIG. 2 which allows blocks written to one volume to be redirected to other storage elsewhere in the data center (or other storage system), the periods during which disks can be spun down are increased significantly. Experimental results have shown that the method can cause volumes to be idle for 79% of the time on average and provide an energy saving of 45-60%.

Data is off-loaded temporarily (in block 205), for a few minutes up to a few hours, and can be reclaimed lazily in the background after the home volume's disks are spun up. The data reclaim process can be arranged to be performed when the home volume is idle, but not spun down, and also, in some examples, when the network load is low.

The method is applicable to various types of storage architectures, including Direct Attached Storage (DAS), Network Attached Storage (NAS) and Storage Area Networks (SANs). The method may be applied within a single machine or within a group of well-connected machines, e.g. within a rack, within a data center or across multiple well connected data centers.

The method shown in FIG. 2 may be referred to as 'write off-loading'. It uses periods of write-dominated load to spin disks down and off-load write requests, reverting to normal operation during periods of read-dominated load. When writes are being off-loaded, the write response times and throughput are comparable to using the home volume, but the power consumption may be reduced significantly.

Example implementations of the system of FIG. 1 and the method of FIG. 2 are described in more detail below. Whilst the following description refers to off-loading of data on a block level of granularity, it will be appreciated that data may be off-loaded at coarser or finer levels of granularity. Furthermore, the following description uses volumes as the storage elements which are powered down. This is by way of example only and the methods are also applicable to different levels of granularity (e.g. on a per-disk basis) and other types of memory. In most examples, the memory referred to is persistent memory; however in some examples, volatile memory may be used.

The description refers to three states for a volume:
active: its disks are spinning and I/O (input/output) operations are being performed on it;
idle: the disks are spinning but no I/O operations are being performed; and
standby: the volume's disks are spun down.

In the idle state, the disk spindles continue to use energy even though they are doing no work. For the purposes of the following explanation, it is assumed that all the disks belonging to a volume are in the same state and the power management strategies operate on entire volumes at a time. However, in other examples, the power management strategies may operate at a different (e.g. lower) level of granularity and the disks within a volume may be in different states.

Figure 3:
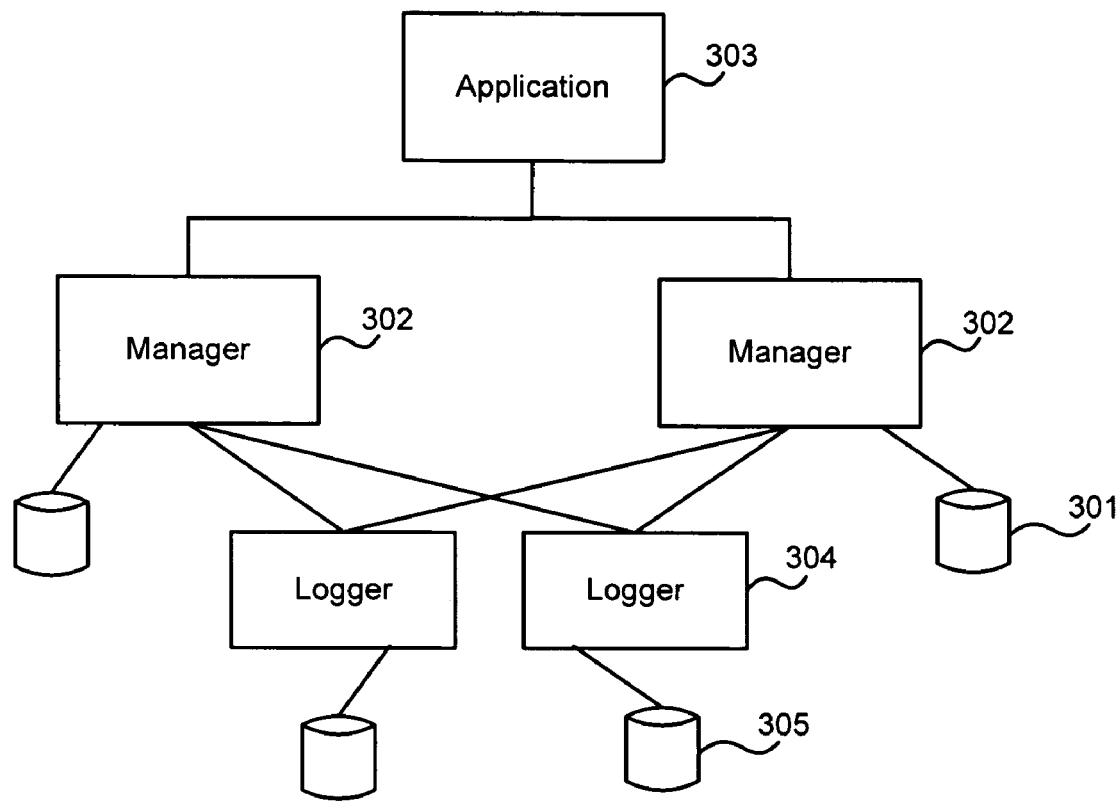
FIG. 3 is a schematic diagram of an example architecture of a storage system.

The write off-loading is implemented using two different components: a manager and a logger, as shown in the architecture diagram in FIG. 3. Each volume 301 supporting off-loading has a manager 302 that is entirely responsible for the volume 301 (its home volume) and decides when to spin the physical disks up or down, and also when and where to off-load writes. Off-loaded blocks are only temporarily off-loaded and the manager is also responsible for reclaiming blocks previously off-loaded. To achieve all these tasks, the manager intercepts all read and write requests to its home volume (e.g. from application 303 or other clients). A manager may be responsible for one or more volumes and therefore may have one or more home volumes. The manager may, for example, run on the server 101, to which the storage is attached or may run within a storage device.

When a manager decides to off-load a block, it selects one or more loggers 304 to store it temporarily. Each logger instance has a small area of storage 305, which is used exclusively to store off-loaded blocks and metadata until they are reclaimed by a manager or no longer required. In most examples, the small area of storage is persistent storage. The following description refers to the use of persistent storage by way of example. The storage 305 associated with a logger 304 could be a disk, NVRAM or solid-state memory such as flash, depending on what is available on each server; the logger's data layout may be optimized for the particular type of storage.

In an example, a logger may use a small partition at the end of an existing volume or a file on an existing volume/disk/NVRAM etc to persist data and metadata. This avoids the need to dedicate additional disks/spindles for off-loading. The remainder of the volume functions as before, and could have an associated manager to enable off-loading. In general, a volume might host zero or more managers and zero or more loggers on the same set of physical disks. An example configuration for a data volume may be: one manager and one logger, with the latter using a small partition at the end.

The set of loggers 304 that a manager 302 uses is configurable and the loggers used by a manager may offer the same or better failure properties as the home volume. Whilst loggers could be selected which provide worse failure properties, this may not be suitable for many applications where data integrity and reliability is important. In some examples a combination of loggers with the same or better failure properties and loggers with worse failure properties (e.g. ones which use volatile storage) may be used. In such an example, the volatile storage may be used to store additional copies of data and provide better availability of data for read requests, whilst the persistent storage provides the failure resilience.

The manager may also be configured so that it will, for example, only off-load blocks to loggers residing on the same server as itself, in the same rack, or across the entire data center. Different managers may use different off-loading strategies and the strategy used in any instance of off-loading may be dependent on the application issuing the intercepted request.

The following description refers to two states for a manager or logger component: active and standby. When a manager or logger component is referred to as being in standby, the volume used by that component has transitioned to the standby state. When a manager goes into standby (i.e. when it puts its home volume into standby), it will force loggers sharing the same physical disks (e.g. those loggers which use a small partition on the home volume) to go into the standby state. The manager will then off-load writes to loggers that are not in the standby state. Loggers using solid-state memory or NVRAM do not enter the standby state as they are not located on a volume which may go into standby.

Figure 4:
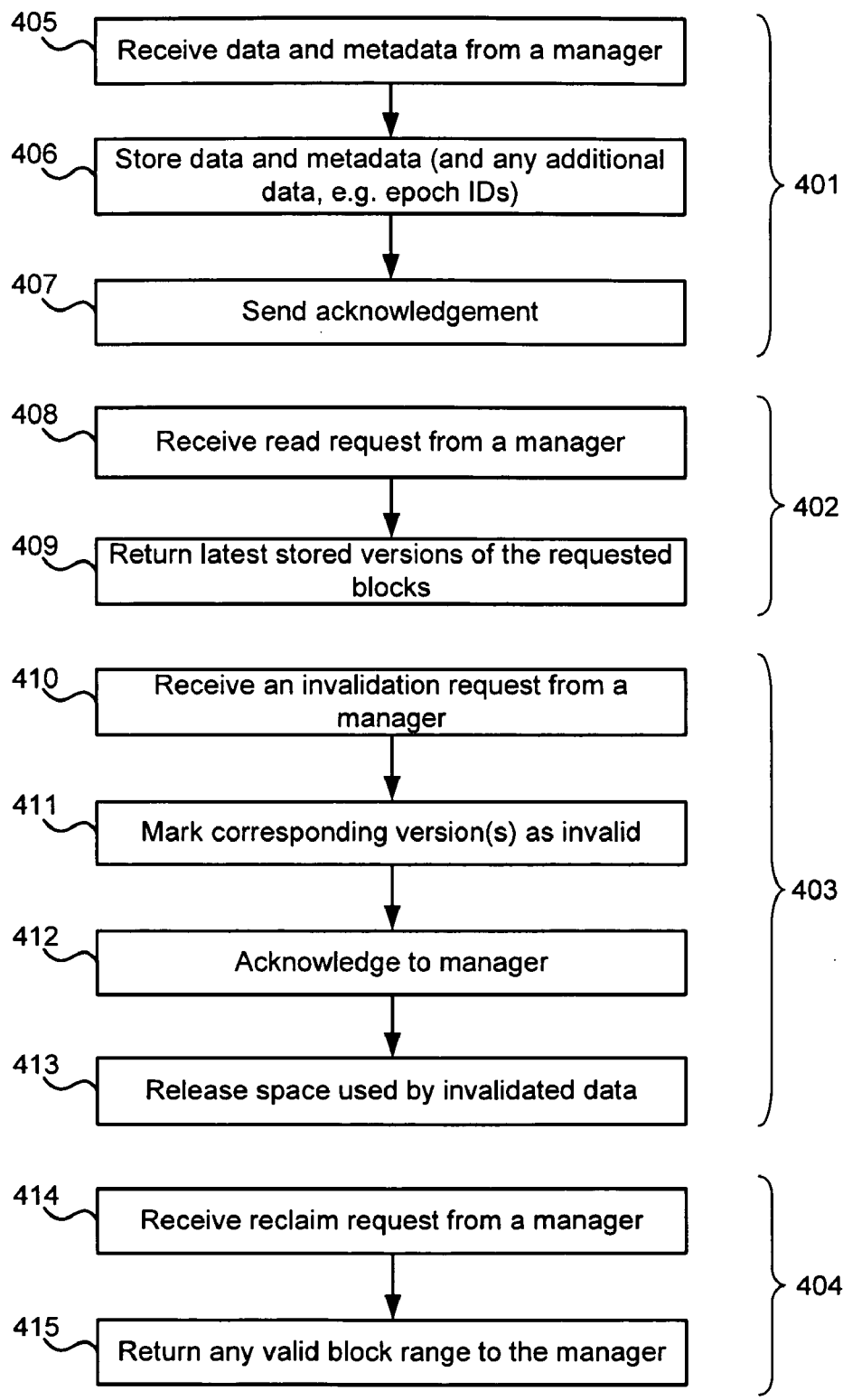
FIG. 4 shows flow diagrams of example methods of operation of a logger.

The following description provides more detailed example implementations of a logger and a manager. Loggers support the following remote operations as shown in FIG. 4: write 401, read 402, invalidate 403, and reclaim 404. A write 401 consists of receiving blocks and metadata from a manager (block 405) and storing (or persisting) the provided blocks and metadata (block 406). The metadata may comprise the source manager identity, a range of logical block numbers (LBNs), and a version number. Additional data may also be stored, either within the metadata or separately, for each write request (in block 406), such as one or more epoch IDs (as described below). Once the data is stored (in block 406), this is acknowledged to the manager (block 407). A read 402 returns the latest stored versions of the requested blocks (blocks 408-409).

An invalidate request (received in block 410) specifies a set of blocks and versions that are no longer required. To ensure consistency, the invalidate request explicitly includes version information, and the logger durably marks the corresponding versions as invalid (block 411) and acknowledges this to the manager (block 412). The logger can then lazily release the space used to store the invalidated data and metadata (block 413). A reclaim request (received in block 414) is similar to a read, except that no block range is specified: the logger can return any valid block range it is holding for the requesting manager (block 415). Invalidates and reclaims are non-latency-critical operations; reads and writes are latency-critical but reads are likely to be rare due to the use of techniques such as main-memory caches. Hence loggers may be optimized for the performance of writes 401.

An example implementation uses a log-based on-disk layout for storing the off-loaded writes and metadata. This gives writes a good locality; both data and metadata are written with a single I/O to the current head of the log. Log compaction and other maintenance tasks may be done in the background with low priority. Metadata about the valid blocks stored for each manager, their versions, and their location in the log may be cached in main memory for fast access.

Figure 5:
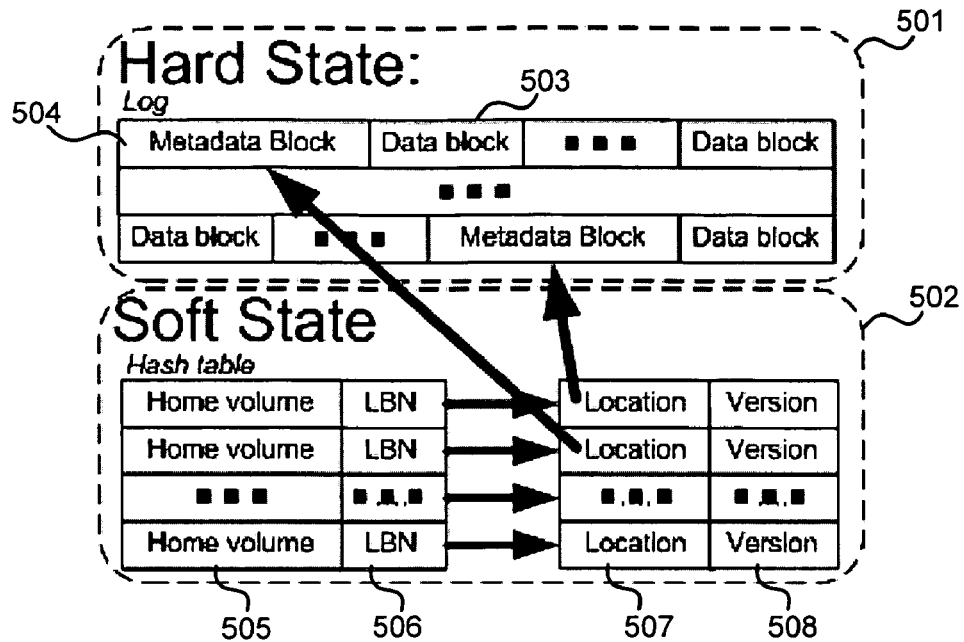
FIG. 5 shows representations of two data structures maintained at a logger and two data structures maintained at a manager.
Figure 5:
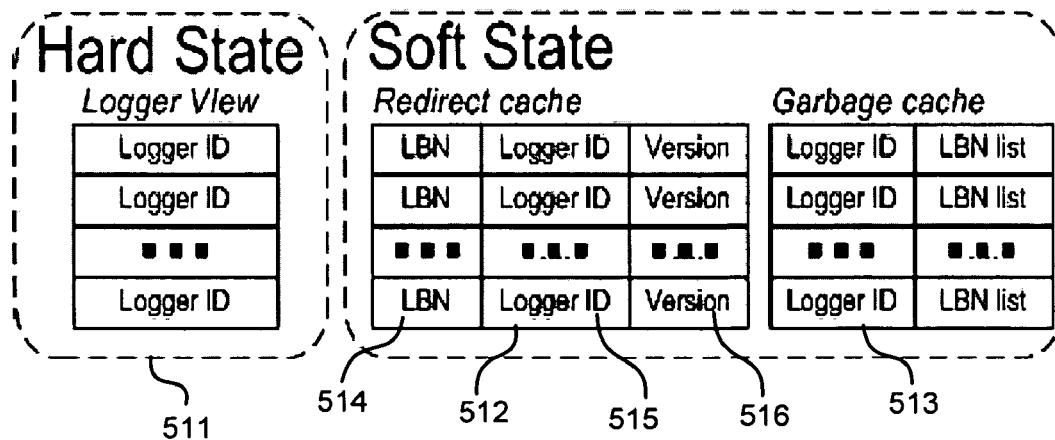

FIG. 5 shows representations of two data structures 501, 502 maintained at the logger. The hard state 501, which is maintained persistently, comprises the stored data blocks 503 and associated metadata 504 (which may comprise the source manager identity, a range of LBNs and a version number). In one embodiment, the hard state 501 may comprise pairs of a data block 503 and associated metadata 504. Such a logger may be based on the idea of fixed-size chunks, with a fixed proportion allocated for metadata. However this requires prefetching chunks and keeping them in memory, and this may result in a bottleneck when there are large numbers of concurrent I/Os. Alternatively one metadata element 504 may relate to more than one data block 503. Such a logger, which may be referred to as a 'chunkless logger', is based on variable-size log records (which may be in units of 512-byte blocks), each with a metadata block followed by data blocks if any. The hard state 501 also comprises a header block (not shown in FIG. 5) which stores data about the log and is described below.

The soft state 502, which may be cached in main memory, comprises details of the LBNs 506 stored for each manager (or home volume) 505, their location 507 and version 508. Whilst the hard state 501 may comprise multiple versions of the same block, some of which are 'stale' (i.e. marked as invalid but not yet deleted), the soft state 502 does not include details of stale versions but comprises a list of the most recent version of any block stored for a manager. The soft state enables a logger to find blocks quickly within the hard state when a request is received from a manager. If the soft state is lost due to failure or shutdown, it can be recreated from the hard state. In some embodiments only a hard state 501 may be maintained at the logger; however where a soft state is maintained, read and reclaim requests can be serviced more quickly.

Figure 6:
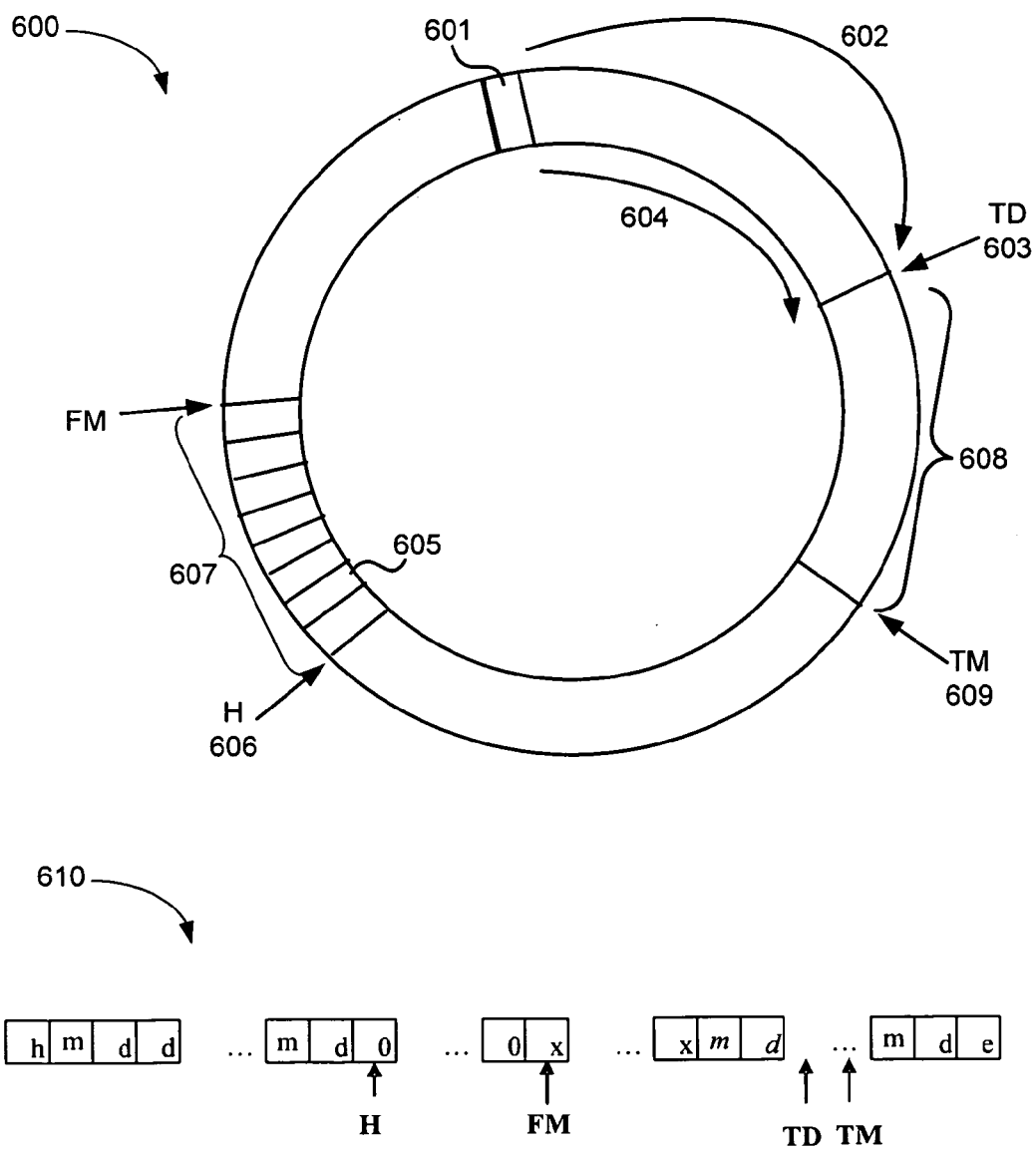
FIG. 6 shows two representations of an on-disk log.

In an embodiment, the hard state 501 may comprise a circular on-disk log 600, as shown in FIG. 6. The log 600 comprises a header block 601, which may be at block 0. The header block stores a pointer (indicated by arrow 602) for the tail 603 of the log. The tail 603 marks the position where all preceding data in the log is stale. If the log is read going forward from the tail 603 (in direction of arrow 604) until a null block 605 is reached, all the data will be read, but this may include some invalid versions, and this is how the soft state may be recreated. New data is written at the head 606 of the log (i.e. overwriting some of the null blocks 607). This new data comprises metadata and any data blocks. There may be no data blocks (e.g. for an invalidate operation) or one or more data blocks (e.g. for a write operation). When data blocks are invalidated they are considered stale (e.g. blocks 608), and the position TM, 609 of the first non-stale block is stored in memory. The log wraps circularly around the disk (skipping the log header) and a linear representation 610 is also shown in FIG. 6.

Figure 7:
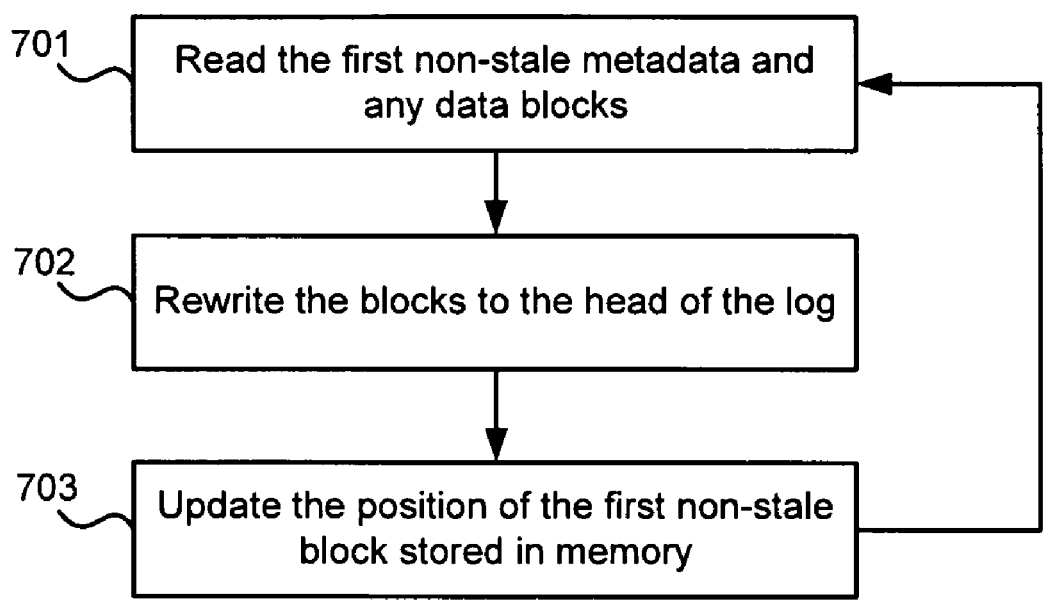
FIG. 7 is a flow diagram of an example method of compaction of an on-disk log.

The space used by invalidated (stale) data between TD and TM (i.e. blocks 608) is recovered when the header 601 is rewritten to update the value of TD to equal TM. However, some invalidated data blocks may lie in the range between TM 609 and the head pointer 606. These invalidated blocks are recovered by compaction operations which may be triggered by, for example, changes in disk load or in remaining free log capacity. FIG. 7 shows a flow diagram of an example compaction method. One compaction operation consists of reading the metadata block (and any associated data blocks) which start at TM 609 (block 701), and rewriting them to the head 606 (block 702), advancing the head appropriately. TM is then updated to point to the position of the next non-stale block (block 703), which may allow TM to skip over not only the recently copied metadata and data blocks but also any subsequent "bubble" of invalidated data blocks. The compaction operation may be repeated. Compaction generally takes place only when the disk is idle; however if most of the disk capacity is used, (e.g. 90%) then compaction may occur even if the disk is active.

A nuller is used to null blocks ahead of the head 606 of the log, so that there is a null block ahead of any newly written data. An alternative to using a nuller to null blocks ahead of the head of the log, is to write a null block after each data block written to the head of the log and then to overwrite the null block with the next write. However, if a write failure occurs, this can result in errors in the log. If single writes are issued with the trailing null block being overwritten with the new metadata block, then if the write fails part-way through the log will be un-terminated, and undefined erroneous data will appear during recovery. One method to address this is to perform writes in two-phases, firstly writing the new data, waiting for that to complete, then committing it by overwriting the null with the new metadata block. However, this will be very slow. Use of pre-nulled blocks, as shown in FIG. 6, enables multiple writes to be issued in parallel which improves performance.

An alternative design that avoids pre-nulling is to have the records be "self-verifying". In such an embodiment the record header includes an "epoch number" (which is incremented every time the logger "wraps around" the beginning) and a checksum over the records data and the metadata. During recovery if a record is read that has an earlier epoch than the previous one, then the log is considered to be terminated at that point. This alternative and further examples of loggers are described in more detail below.

In an example of a logger, the log disk has four types of blocks:

Log header: Block 0 of the disk stores the LBN number of a valid log tail, i.e. the log can be recovered by scanning it forwards from this point.

Record header: Stores the client LVN (logical volume number, 32 bits), start LBN (32 or 64 bits), block count (32 bits), flags (32 bits), version (64 bits), data checksum (128 bits). A single checksum may be used over all the blocks or a list of checksums may be provided, one per block. The 'record valid' flag indicates if this is a valid record header. The 'data valid' flag indicates if the record has valid data (i.e. was a write not an invalidate), and in this case the data blocks will follow the header block. In another embodiment, a 'data valid' flag may not be used but this may be encoded as convention when the block count is zero.

Data block: Contains the data written by the client; data blocks follow the log record header and checksums, in client LBN order.

Null block: a record header block with the 'record valid' flag cleared. E.g. a block with all zeroes, which is used to mark the head of the log.

There are four pointers (LBN numbers) that are maintained in memory (or on disk in some cases):

In-memory head pointer H: this points to the block immediately after the last written log record; this block is guaranteed to be a null block.

In-memory tail pointer TM: this points to first record that is not stale.

On-disk tail pointer TD: Stored in the log header; is a correct tail, i.e. it points to a valid metadata block, all preceding records are stale or invalid, and all subsequent records are valid (but may be stale). TD defines the start position for soft state log reconstruction after a crash.

In-memory next-to-format pointer FM: First block after the head that has not been nulled. On failure recovery, this is set to H+1.

The relative positions of the four pointers described above are shown in FIG. 6. The linear representation 610 also shows the block contents, where h is log header, m is metadata, d is data, 0 is null block, e is end-of-disk, x is arbitrary contents (i.e. junk) and italicized characters indicate valid but stale data/metadata. In other words, the invariant is H<FM≦TD≦TM. These are not normal numeric inequalities since the log wraps around the disk (as shown by the circular representation 600), but the inequality specifies the ordering of these quantities in the circular LBN space 1 ... <n−1> of the logger's disk space (where LBN 0 is the log header).

There are a number of log operations:
write/invalidate
wrap-around
in-memory tail advance
log header update
free block nulling
reclaim/read
background operations prioritization
and these are described in more detail below.

Write/invalidate is the main, foreground operation. Each write/invalidate request writes a metadata block(s) followed by data blocks if any, in a single sequential write, to the current head position H. If N blocks are written, it is first checked that H+N<F, in other words there will still be a null block at the new head of the log. After the write, H←H+N.

Multiple write/invalidate operations can be issued concurrently, as long as they are written to contiguous, non-overlapping parts of the disk. However, for failure recoverability the operations are acknowledged in the order in which they occur in the log. If the writes are issued to a logger in standby (i.e. the volume is spun down), the logger will force a spin-up; however, this may be avoided, where possible, as the manager will probe the loggers first to check their status. In some examples, a manager may not be able to off-load writes to a logger in standby. Invalidations which may be issued to a logger in standby will be queued until the next spin-up as they are not latency-critical and will be acknowledged to the client once they are written to the log. If a log write would go off the end of the disk, then it is wrapped around to the beginning (i.e. block following the log header). In this case it is split it into two concurrent I/Os.

Whenever the in-memory data structures are updated, the log record corresponding to the in-memory tail is checked to see if it is now completely stale, (i.e. that there are no non-stale data blocks between stale data blocks). If it is, the in-memory tail is advanced until this is no longer true (i.e. it is advanced until the end of the contiguous stale data). If there are lots of stale blocks in the tail, but no section of contiguous stale data which would enable the in-memory tail to be advanced, the valid blocks from the tail may be re-written at the head of the log and the original versions (in the tail) marked as stale. This process may be referred to as 'compaction'.

If the on-disk tail pointer lags the in-memory version, the log header may be updated depending on whether the disk is idle, or perhaps the available log space is too low. If the disk is idle, and there are less than the target number of null blocks (e.g. 1 GB), and the format pointer FM has not caught up with the on-disk tail TD, then up to one batch (e.g. between 1 to 16 MB) of blocks may be nulled at a time. When the head catches up with the nuller any write requests are rejected. An alternative to rejecting requests would be to append a null block to the writes in this case, but this would prevent concurrent writes, since they would overlap unless a different mode (e.g. specifically for serializing appends) was used. Another technique would be to increase the nuller priority inversely proportional to the distance between H and FM: as H approaches FM, the nuller priority increases.

Reclaiming and reading is done without any log-writing; the latest version of any requested block, and its location, are available from the in-memory structures, so a read is scheduled. For reclaims, since the client is happy with any block, the logger attempts to pick the one which is closest to the tail, to maximize the chances of tail advance. For both read and reclaim, reads of contiguous data blocks are coalesced to minimize the number of I/Os. Reclaims are rejected if spun-down or busy; reads are serviced, spinning up the disk if required.

Background operations, such as reclaiming, nulling, compaction, queued invalidates and log header updates, occur only when the disk is idle, and the number of I/Os issued concurrently each time the disk goes idle may be limited (e.g. to 16). The background operations may be prioritized such that queued invalidations are issued first; then queued reclaims, then a nulling request if possible, then compaction if possible; otherwise a log header update if possible.

Log recovery (e.g. where the soft state has been lost) consists of reading the tail pointer from the header; reading each log record header and updating the in-memory structures (i.e. the soft state); advancing to the next header (wrapping around if necessary) until a null block is reached, which is the head. If an entry whose checksum does not match is reached, then the process stops there, nulls the first block, and calls it the head. This is likely to be a log record that was not completely written before a crash and since it was not acknowledged (because the write was not completed, as shown in 401 FIG. 4), it can be discarded. However, if there were writes to subsequent log locations, these are also discarded by this process and therefore, as described above, writes are acknowledged in log order to ensure that only those writes which have not been acknowledged will be discarded. The checksums help guarantee that log appends are atomic, along with the fact that data is only written when it is guaranteed that the new head will be a null block after a successful write, which makes sure that the log is correctly terminated.

The in-memory structures (i.e. the soft state) may comprise the following (in addition to maintaining H, TM, TD, and FM mentioned before):

A log record structure for each log record having at least one valid data block. This contains all the information except checksum and flags of the on-disk record header, and also the LBN where the on-disk record header starts. It also has a refcount (>0) of the number of valid data blocks (i.e. which are the latest versions of some LBN), and a log position: a 64-bit counter that monotonically increases with every log append.

A hash table (or range map) mapping each client address to a per-client structure.

A per-client structure: comprising a range map mapping LBN ranges to the log records that own them and a linked list of log records for this client, in log order.

A list containing one entry per client having any valid blocks, pointing to the per-client structures, and sorted by the log position of the list head.

The list is kept sorted by the log position of the client's tail. Thus the tail of the list points to the client whose linked list head will give the TM. Whenever a client's tail changes, its position in the list is recomputed, which is O(#clients), but this is expected to be infrequent, and to have a small number of clients.

A list of in-flight log writes (in log order), each with pending I/Os scoreboard. These are committed in log order when the pending I/Os complete.

When data is appended to the log, a new log record is created which is appended to the head end of the appropriate client's list, then each LBN list in the hash table is updated to point to the new record. If the LBN already points to some log record, that record is de-referenced; if it goes to zero then it is deleted; if it was the head of the list then the client is deleted; if TM changed then it is updated.

Invalidation records are appended to the disk log, but are not maintained in memory. The only in-memory update is to the hash table (or range map): if an invalidate request with version v is received, then ownership of the LBN range is taken away from any in-memory records having a version which is less than or equal to v. The client ensures that for any LBN, every write has a strictly greater version than any previously issued invalidate for that LBN. Otherwise it would not be possible to garbage-collect the most recent invalidation record for any LBN.

As described above, the integrity of the log is maintained at all times, across failure and recovery of the logger component. This means that after recovery the log only reflects writes that have been issued by some client; and that it reflects all writes that have been acknowledged to any client. These properties are guaranteed if it is possible to correctly find, on recovery:

a valid tail for the log i.e. a log record such that all valid and current data in the log occurs after this record the head of the log, the position of the last valid log record.

The first property may be guaranteed by keeping a pointer to a valid tail (TD) in the log header block. If the tail advances, then the logger lazily updates this pointer in the log header block. Since the log is circular, the head can eventually catch up with TD; however the head cannot go past TD, i.e. the record referenced by TD or any subsequent record is not overwritten.

The second property requires that the first invalid log header ("termination marker") is identified when scanning the log during recovery. This can be done in a number of different ways, and two examples that have been described above:

append a termination marker to each log write; this marker will be overwritten by the next log write. In this scheme log writes cannot be issued concurrently, which can reduce performance under load.

use a "nuller": a background process that marks unused blocks as invalid by writing the termination marker value to them. With this scheme log writes can be issued concurrently, however it requires additional disk bandwidth for the nuller.

In another example, a nuller (as in the second bullet above) may be used as the default, and the method may fall back on appending a termination marker (as in the first bullet above) when the situation arises that a write would otherwise not be possible because there are insufficient blocks already nulled.

Another example, which is described briefly above, is to use an unforgeable epoch ID. In this scheme, each valid log record header contains its own epoch ID and a copy of the previous log record's epoch ID. The epoch ID may be any bit string (e.g. 1024 bits in length) that cannot be forged. It could be generated, for example, using a strong random number generator, or a secure digital signature based on a secret key. A fresh epoch ID may be generated for each log write, but it is sufficient to generate a fresh epoch ID each time the circular log wraps around the beginning of the disk. On recovery, every valid log header (other than the very first one scanned, i.e. the tail) is checked to see if it correctly reflects the previous log record's epoch ID. A block that does not satisfy this property is not a valid log header, and the log is considered terminated at that point.

All these schemes for providing log integrity prevent accidental corruption of the log, as well as protecting against malicious "spoofing" attacks. An example of a spoofing attack is a manager writing data that resembles a log header from another manager, followed by a log wraparound, a logger failure, and a logger recovery. If the recovery process does not correctly identify the valid portion of the log, it may incorrectly interpret a data block as a log header: if this data block was written by the malicious manager, then this could result in corruption of some other manager's data. Thus the logger ensures that a data block is not misinterpreted as a correct log header. The first two schemes (or the combination thereof) achieve this by terminating the log with a special termination marker; blocks beyond the termination marker are not read during recovery. The final scheme described above achieves this by preventing an adversary from guessing at spoof time the correct epoch ID that will be required at recovery time.

The manager 302 controls the off-loading of blocks, deciding when to off-load blocks and when to reclaim them. It is also responsible for ensuring consistency and performing failure recovery. To achieve this, each manager maintains persistently the identities of a set of loggers with which it interacts, referred to as the logger view 511, as shown in FIG. 5. The number of loggers in the logger view may vary between managers or may be fixed. Having a large number of loggers provides managers with more options, particularly where a number of them may be in standby; however, if data is spread among a large number of loggers, the managers requires more loggers to be active to enable data to be reclaimed. The manager also maintains two in-memory data structures 512, 513. The data structure 511 which is stored persistently may also be referred to as the hard state and the in-memory data structures 512, 513 may be referred to collectively as the soft state.

The redirect cache 512 stores, for each block off-loaded, the block's LBN 514, the identity of the logger storing the current data for the block 515 and the corresponding version number 516. Version numbers are unique monotonically increasing values (e.g. 64-bit quantities), which ensure that the manager can identify the last written version of any block during failure recovery. The redirect cache 512 may also comprise a one-bit "local" flag (not shown in FIG. 5) which identifies that the latest version is already on the local disk (i.e. in the home volume), but that the off-loaded copy has not yet been invalidated by the logger. The garbage cache 513 stores the location of old versions of blocks. In the background, the manager sends invalidation requests for these versions; when these are committed by the logger they are removed from the garbage cache. Before invalidating the latest off-loaded version of any block, the manager checks first that (a) the data from this latest version has been written to the home volume (e.g. that the 'local' flag is set) and (b) all older versions on other loggers than the one holding the latest version have been invalidated and acknowledged to be so.

The operation of the manager can be described with reference to FIGS. 8 and 9 which show flow diagrams of example methods of operation. The manager intercepts all read and write requests sent to the home volume (block 801). For a read request ('Yes' in block 802), the manager first checks the redirect cache for existing logged versions (block 803). If none is found ('No' in block 803), the read is serviced locally from the home volume (block 804), causing it to transition from standby to active if necessary ('Yes' in block 805 and block 806). Otherwise ('Yes' in block 803) the request is dispatched to the logger identified as having the latest version of the block (block 807). Multiblock reads are split as required, to fetch data from the home volume and/or one or more loggers.

For a write request ('No' in block 802), the manager off-loads the write to a logger (blocks 811-816) if the home volume is in standby (if 'Yes' in block 808). It also may offload the write if there are currently logged versions of any of the blocks ('Yes' in block 809), so that the new version is persistently recorded as the latest version. Alternatively, where there is a currently logged version of any of the blocks ('Yes' in block 809), the manager could invalidate the currently logged version, write the new version to the home volume, and only acknowledge the write request when both of these operations have completed (i.e. been acknowledged, not shown in FIG. 8). Writes that are not off-loaded ('No' in both blocks 808 and 809) are sent directly to the home volume (block 810).

To off-load a write, the manager first chooses a logger. In one embodiment, the manager probes the loggers in its logger view (block 811): this may, for example, be done using subnet broadcast for efficiency. Each logger replies with a set of metrics such as the power state of the logger's volume, its queue length, the amount of available space, etc (block 812). The manager ranks the loggers using these metrics and selects one to off-load the write to (block 813). The manager sends the write request to the selected logger (block 814) and when the write is committed and acknowledged by the logger (block 815), the manager updates its redirect cache with the latest version and moves any older versions to the garbage cache (block 816). Once the write has been confirmed (either by the home volume or the logger), the write can be acknowledged to the client which sent the intercepted request (block 817).

In some examples, the manager may select more than one logger (in block 813) and send the write request to each selected logger (in block 814). The write may be acknowledged (in block 817) once a defined number of loggers, or a defined proportion of loggers, have confirmed the write. This is referred to as 'k-way logging'.

The probing of loggers in the logger view (in block 811) enables the manager to perform load balancing between loggers. However, in some examples, load balancing (i.e. blocks 811-813) may not be performed. In such an example, the manager may select a logger based on other parameters or may select the same logger each time etc. In another example, the manager may not probe loggers on interception of a write request (as shown in FIG. 8) but may instead dynamically track the status of the loggers in its logger view. In such an example, blocks 811 and 812 are omitted and the manager selects a logger (in block 813) using the metrics which it is dynamically tracking.

When the home volume is idle, the manager reclaims off-loaded blocks from loggers in the background (block 901) and writes them to the home volume (block 902). After the reclaimed blocks are written to disk, the manager sends invalidation requests to the appropriate loggers. To ensure correct failure recovery, the latest version of a block (the LBN of which is in the redirect cache) is invalidated only after all older versions (the LBNs of which are in the garbage cache) have been invalidated. Therefore invalidation requests are sent first to the logger with the oldest version (block 903) and once acknowledged by the logger (block 904), the redirect/garbage cache can be updated (block 905). The process (blocks 903-905) is repeated until the latest version of the block (which may be stored in the redirect cache with a flag identifying that it has been written successfully to the home volume) has been invalidated. The background reclaim and invalidation ensure that all blocks will eventually be restored to the home volume and that logger space will eventually be freed.

The manager also sends invalidation requests to loggers in relation to blocks which have been added to the garbage cache as a result of a more recent version being written to a logger (as in block 816). These invalidation requests are sent as a background operation as shown in blocks 903-905 and again, as described above, the oldest versions are invalidated before more recent versions.

Figure 10:
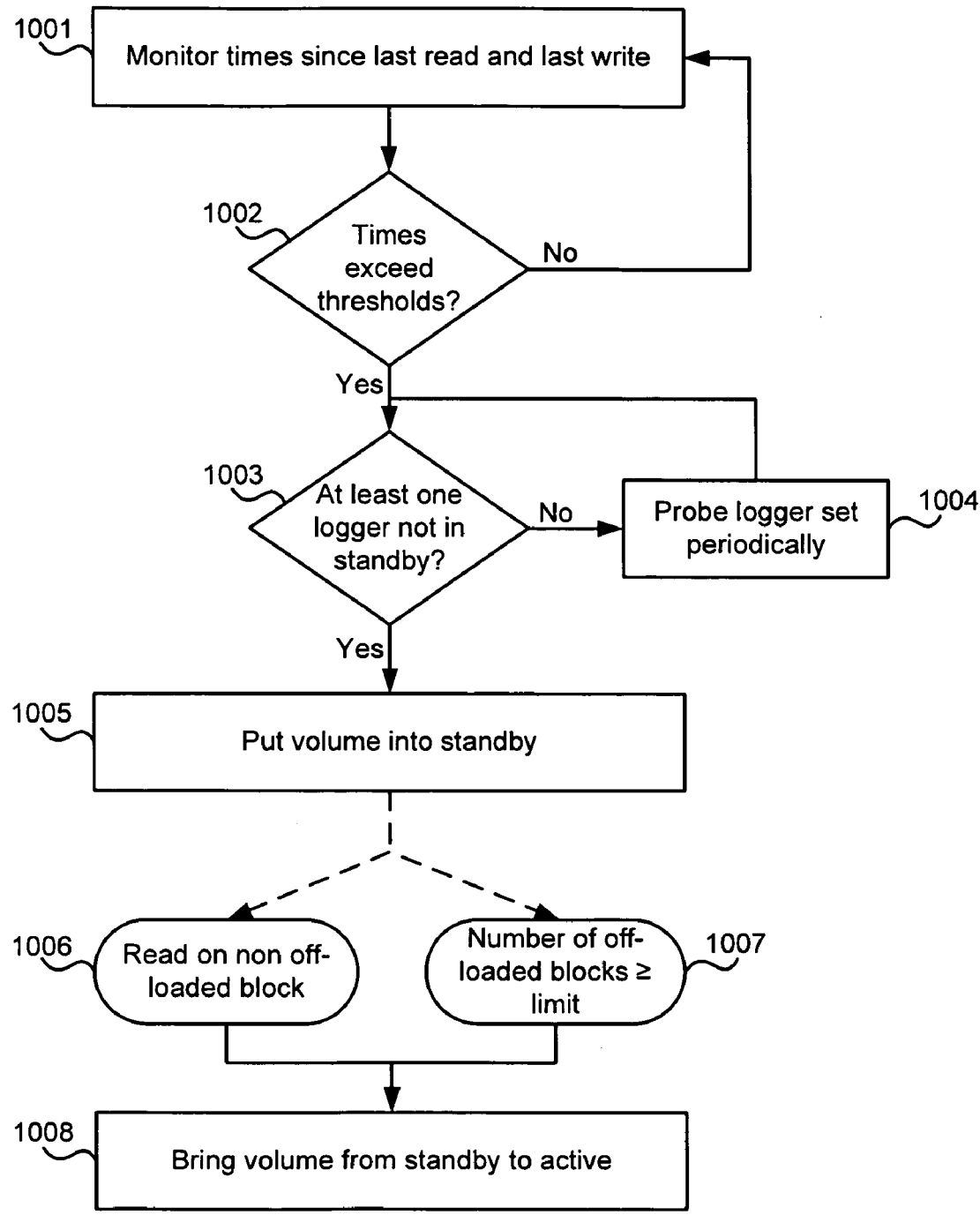

The manager also controls state transitions to and from standby for the home volume, as shown in FIG. 10. The manager monitors the elapsed time since the last read and the last write (block 1001); if both of these have passed a certain threshold (block 1002), where the read and write thresholds may be different, it spins the volume down (block 1005) and off-loads all subsequent writes (as shown in FIG. 8). In an example, the thresholds may be set at 60 seconds of no reads and 10 seconds of no writes. In another example, the threshold may only be dependent on a period of no reads, with no criteria being specified based on writes.

The volume spins up again (block 1008) when there is a read on a non-off-loaded block (block 1006, as in block 806 of FIG. 8), or when the number of offloaded blocks meets or exceeds a limit (block 1007, to avoid off-loading very large amounts of data). Before putting the volume into standby (in block 1005), the manager first ensures that there is at least one logger in its logger view that is using a set of disks different from its own and that is not currently in standby (block 1003). This ensures that any future writes to the home volume can be off-loaded by the manager without waiting for disks to spin up. If there are no such loggers ('No' in block 1003), then the manager does not spin down, but periodically probes its logger set for any change in their status (block 1004).

This design is optimized for the common case: during periods of intense activity, the home volumes will be in the active state, and all I/Os will be local, except for a small number of requests on blocks that are currently off-loaded. During periods of low, write-dominated load, the home volume is likely be in standby and writes will be off-loaded to a logger.

If the manager cannot find any available loggers (e.g. in response to the probe in block 811), it spins up the home volume in the background, and retries the request until a logger is found or the home volume is spun up. If a volume needs to be taken off-line (e.g. for maintenance) then the manager spins it up, as well as all volumes that it depends on or that depend on it. It then forces blocks to be reclaimed until the volume has all its own blocks and none of any other's, i.e., its state is restored as if no off-loading had occurred. As part of this process, the manager may communicate with all managers to ask them to stop sending new offloaded data to its logger and to ask them to reclaim anything they have off-loaded in the past. In parallel, the manager will be reclaiming its own blocks until they are all back on the home volume.

Enterprise storage is expected to provide consistency and durability despite transient failures such as reboots as well as single-disk permanent failures. At the volume level, the failure resilience with off-loading is the same as that without. However, off-loading can create failure dependencies between managers and loggers. With off-loading at the rack or data center level, a manager on machine A could off-load blocks to a logger on machine B: if machine B suffers a failure, then the off-loaded blocks would become unavailable on machine A until machine B was brought on-line again. This can be addressed by off-loading each block to multiple independent loggers using k-way logging (as described above). With k-way logging, a manager can tolerate up to k−1 failures in its logger view for retrieving its data.

Figure 11:
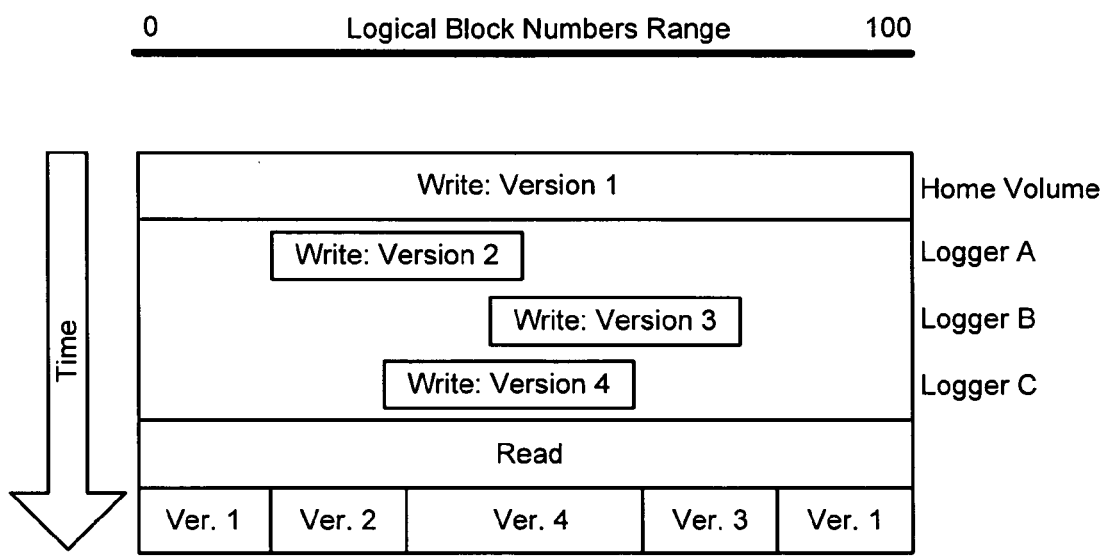
FIG. 11 shows a schematic diagram of multiple writes of different versions of the same data.

Write off-loading provides both consistency and durability across failures. Durability is achieved by acknowledging writes only when both data and metadata have been reliably persisted (as described above), i.e. write-back caching is not used. Consistency is achieved by using versioned metadata to mark the latest version of a block. When a read is performed for a range of blocks, it is quite possible that the required blocks are distributed over multiple loggers as well as the home volume, as shown in FIG. 11. The manager uses the version information to ensure that the applications using the volume see a consistent view of the stored data. A checksum may also be added to the metadata to ensure that partial writes are correctly detected on failure recovery (e.g. as described above).

If one or more machines reboot due to, say, a power failure, all the loggers recover concurrently by scanning their persistent logs to reconstruct their soft state. Each manager can be brought on-line when all the loggers in its logger view are on-line. A manager recovers its soft state (the redirect cache and garbage cache) by requesting information about all blocks stored for it from each logger in its logger view. To optimize the common case of a clean shutdown/reboot of a server, the manager may write the soft state to a small metadata partition during shutdown; this allows managers to restart after a clean shutdown without any network communication. In an example implementation, a logger may write its soft state to a small metadata partition in a similar manner.

In order for off-loaded blocks to have the same failure resilience as non-off-loaded blocks, a manager's logger view may be restricted to loggers which have the same or higher failure resilience as the home volume. If the storage uses standard solutions such as RAID-1 or RAID-5 for all volumes, then this property will be ensured, and off-loading will provide the same resilience to single disk failures as standard RAID solutions.

When a logger experiences a single-disk failure, it may push all off-loaded blocks to other loggers or the appropriate manager, which typically takes seconds to minutes. This reduces the risk of losing off-loaded blocks due to multiple disk failures; the risk may be further reduced by using k-way logging (as described above).

The above description refers to the off-loading of blocks of data, as identified by their LBN (e.g. as shown in the data structures in FIGS. 5 and 7). In other examples, the data may be off-loaded at a different level of granularity, which may be smaller than or different to the block level. In an example, a manager may off-load byte ranges (e.g. arbitrary byte ranges) from objects (e.g. from files in a file system). In such an example, each off-loaded byte of an object could have a different version stamp and be off-loaded to a different location.

In order to be able to map from byte positions (or in general numbered positions) within an object to some metadata a data structure may be used. An example of such a data structure is a hash table with one entry per position; however for large objects with thousands or millions of byte positions this requires huge amounts of memory. In practice, large numbers of adjacent byte positions will share the same metadata since they are written together and therefore a range map may be used instead of a hash table. A range map offers the same functionality as a hash table based map, but is more memory-efficient.

Range maps support the following operations:

- Insert a mapping from some range to some metadata object. This may overwrite existing mappings if any within that range. If so, the range map optionally generates callbacks for each of these overwritten subranges. A typical use of these callbacks is to adjust a reference count in the metadata object and to free it if no position in the range map maps to it any more.
- Delete any existing mappings for a range, again optionally generating callbacks for any subranges with existing mappings that will now be deleted.
- Search a range for mappings, generating callbacks for each subrange having a mapping.
- Insertion and deletion can also have 'conditional' variants, where the callback function acts as a filter: if the filter returns FALSE, then the specific subrange is not overwritten (or deleted in the case of delete). The underlying implementation of range maps is as an ordered search tree (e.g. a balanced binary tree) of non-overlapping ranges. Each node in the tree contains the range covered and the object mapped to. In an implementation splay trees may be used but a variety of search structures (e.g. red-black trees) can be used.

Write off-loading, as described above, may be used to provide an energy saving in a storage system by enabling volumes to be spun down when they are idle. Write off-loading has a number of other applications, such as to reduce disk I/O over-provisioning, e.g. in a data center. Write off-loading may be used simultaneously in one or more such applications. Use of write off-loading to reduce over-provisioning and/or to use available disk resources when the system is heavily loaded is described in more detail below.

When multiple services/applications run in a data center, the resources are usually over-provisioned for the peak load (or load percentile, e.g. 95%) of each separate service. This requires enough servers to handle the sum of those peaks. However, in most cases, the load peaks are not correlated and therefore the data center may be over-provisioned for the peak load of the combination of the services. If instead, the data center is provisioned for the maximum peak load or for the maximum peak total load, the provisioning costs are reduced. This, however, may result in transient situations where particular disks (or volumes) are overloaded, and this can be accommodated using write off-loading.

During a transient overload period, write requests to an overloaded disk are sent instead to one or more under-loaded disks. Hence, each workload opportunistically 'steals' resources originally dedicated to other workloads, when these latter ones do not need them. In addition, or instead, dedicated storage may be provided for write off-loading which may be local to, or remote from the rest of the storage. Instead of provisioning resources for each workload separately, a pool of resources is effectively made available to all workloads and whichever workload needs the resources uses them. After the overload period, the reclaim mechanism lazily moves the off-loaded data from the opportunistic disks to the original disks. To implement write off-loading for this application, a monitoring mechanism is used to track the load on disks.

In addition to, or instead of, using these techniques in a transient overload period, the methods described herein may be used for load balancing between storage devices, e.g. where a first storage device is more loaded than one or more alternative storage devices.

The off-loaded data may be replicated for availability and/or for improved read performance (e.g. using k-way logging as described above). Selection criteria may be used to determine which disks receive off-loaded writes. For example, currently idle disks will perform the write quickly giving short write response times, and disks that will likely be idle when the off-loaded data is read will yield short read response times. The number of data copies, k, may be tuned to meet the target availability and/or performance.

Write off-loading provides a flexible approach. Write off-loading may be transparent to applications: with applications using the existing file system APIs (application programming interfaces), and a thin shim layer or file system provider translating them to the write off-loading infrastructure. Alternatively, applications may use an API to directly off-load their writes.

Figure 12:
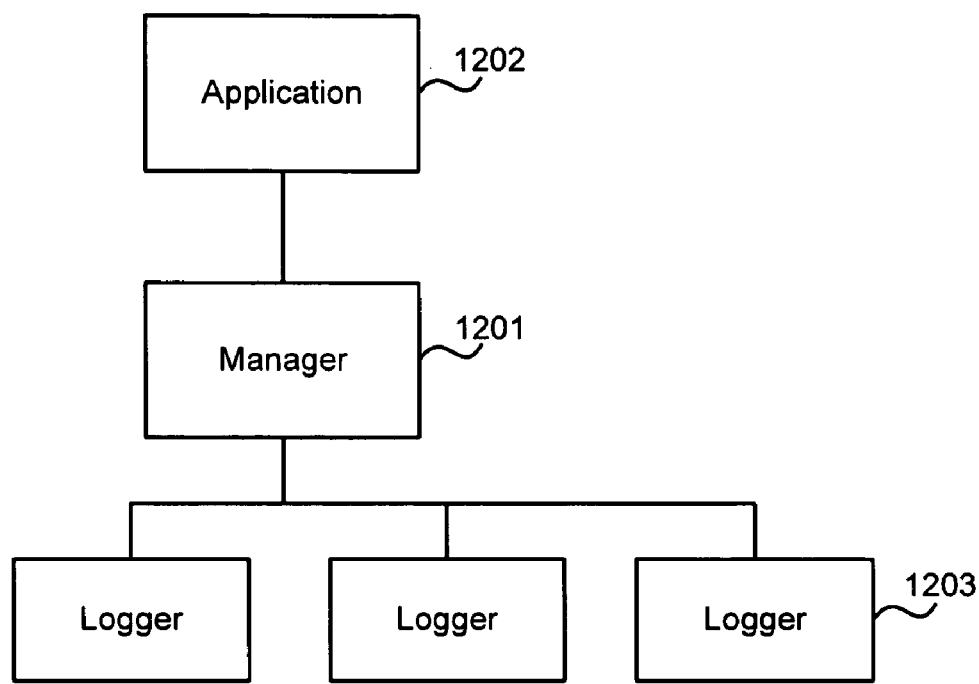
FIG. 12 is a schematic diagram of another example architecture of a storage system.

FIG. 12 is a schematic diagram of the architecture which comprises a manager 1201 (or coordinator) which interfaces between an application 1202 (or other client) and multiple loggers 1203 (or disk loggers). The communication between the manager and the loggers may be over RPC (remote procedure calls). The manager 1201 'owns' a set of objects on the application's (or other client's) behalf and in turns acts as a client to the disk loggers. The manager makes sure the application sees a consistent view of the data and also makes sure that stale state is eventually garbage-collected on the loggers. Both the logger and the manager may export the same API, but the implementation and semantics may be different, and this is described in more detail below.

The methods and examples described below are similar to those described above in relation to power saving applications. It will be appreciated that aspects of any of the methods described herein may be combined with aspects of any of the other methods described herein. Furthermore the methods may be used for any suitable application, including, but not limited to, those described herein.

For example, unmodified applications may use the Win32 or POSIX APIs to talk to a manager. The manager converts Win32 API to ObjectLogger API (the API used for off-loading write requests). Modified applications may link to the manager as a library and use the ObjectLogger API directly and such modified applications may use multiple managers, but only one manager for each I/O. The multiple managers could, for example, occur if the application itself was distributed over many nodes; in this case each node would have a manager. In such a case the application maintains consistency of the data across the different managers (e.g. making sure that different managers don't hold different data for the same object). Each instance of the distributed application however would talk to a single manager.

In the following example each application talks to only one manager. The manager decides, on a per-I/O basis, which set of storage servers to send a request to and this decision may be based on load information for the servers which is stored. In addition, the manager incorporates a metadata service that keeps track of byte ranges for each object. The loggers (which may also be referred to as Objectlogger servers) utilize a log-structured layout to quickly absorb writes. In some examples, the absorbed writes are written back to their original locations, but in other examples, data is only written on the log, i.e. reclaiming is not performed. This may be used for applications where the data is only temporary (e.g. temporary files which are only of ephemeral use, for example, during a compile).

At a high level, the API between the application and the manager supports reads and writes of versioned byte ranges within objects, where the objects have IDs in a flat namespace. So:

read(client_id, object_id, start_offset, numbytes, flags) →
   (data, version, [object_id, start_offset, numbytes])
write(client_id, object_id, start_offset, numbytes, flags, [version, data])

The actual API may be non-blocking, which means that 'read' and 'write' return immediately and the completion is signaled later through a callback (so there are actually some extra arguments to both calls which specify the callback function and the context for that function). 'Version' may be a 64-bit logical timestamp. The client (i.e. the application) is responsible for making sure that the version is correctly incremented between calls to 'write'. 'Read' returns the latest version of each byte requested, and also a version number which is the highest version of any byte returned.

'Flags' may be used to indicate one or more of:
- The operation is 'background', i.e. low-priority operation not on the critical path of any top-level Request.
- For reads, there is a 'read any' option which means 'give me any valid byte range for any object', in which case the read also returns the object ID and the byte range.
- For writes, there is a 'delete' option which means that the byte range has now been deleted: in this case the data argument is ignored. The logger now remembers that the latest value for this byte range is 'doesn't exist'.
- For writes there is also a 'volatile' option. This means that the logger is allowed to discard this write (e.g. if it needs to release some space), as long as it also discards any previous versions. So combining this with a delete means 'delete this byte range and forget about it' and combining it with a write of some data means 'remember this data for subsequent reads if possible but you're allowed to discard it without compromising correctness'.
- For writes there is also a 'mark-volatile' option. This assumes that the logger previously wrote non-volatile data for this byte range, and this data is now considered instead to be volatile: i.e. it may discard it without compromising correctness.

Flags may be used to handle all the different reasons for which a client might use read or write: e.g. in response to a top-level request; to fetch back data in the background that has been temporarily written to a logger; to garbage-collect in the background old versions that have been left on a logger, to mark replicas as best-effort, etc.

API calls may be provided to retrieve the metadata state, e.g. 'what objects and what byte ranges are you currently holding for this client?', 'what is the highest version number I am currently storing' etc. These may be used for failure recovery and/or so that the client does not have to keep its own copy of all this state.

The operation of the logger may be as shown in FIG. 4 and described above, although the method may operate a different granularity and may use different client/object IDs. The logger (or disk logger) appends all writes to the head of a circular log (e.g. as shown in FIG. 6 and described above). Each log record contains a header and the data to be written: the header may comprise some or all of: the client ID, object ID, version, a checksum, and a valid bit. The checksum makes sure that in case of a failure it is possible to identify any partially written records. The valid bit enables detection of the end of the log after failure. Log records may be padded out to the nearest sector where the underlying disk device only supports sector-aligned writes. Compaction may also occur, as described above with reference to FIG. 7.

Figure 8:
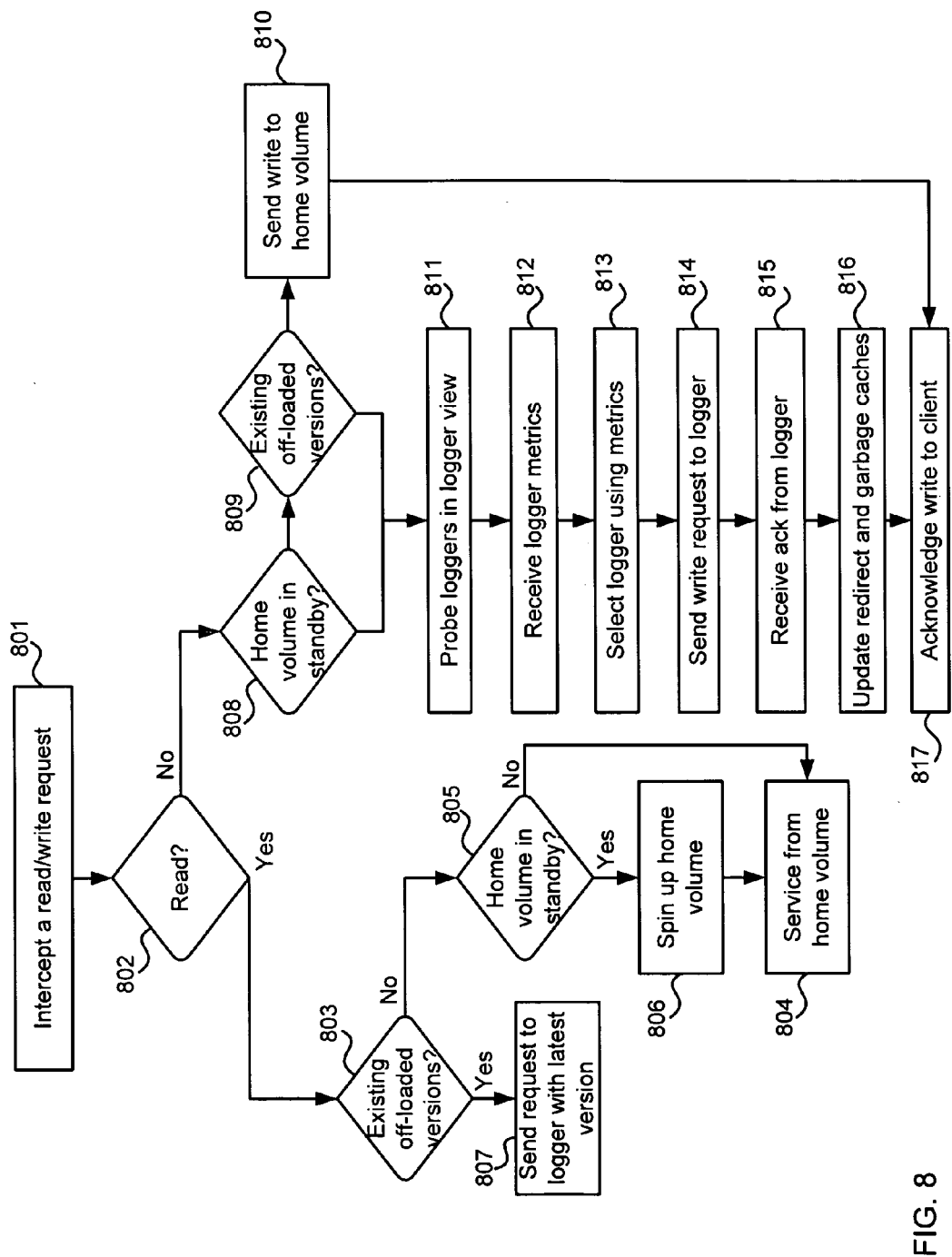
FIGS. 8-10 show flow diagrams of example methods of operation of a manager.
Figure 9:
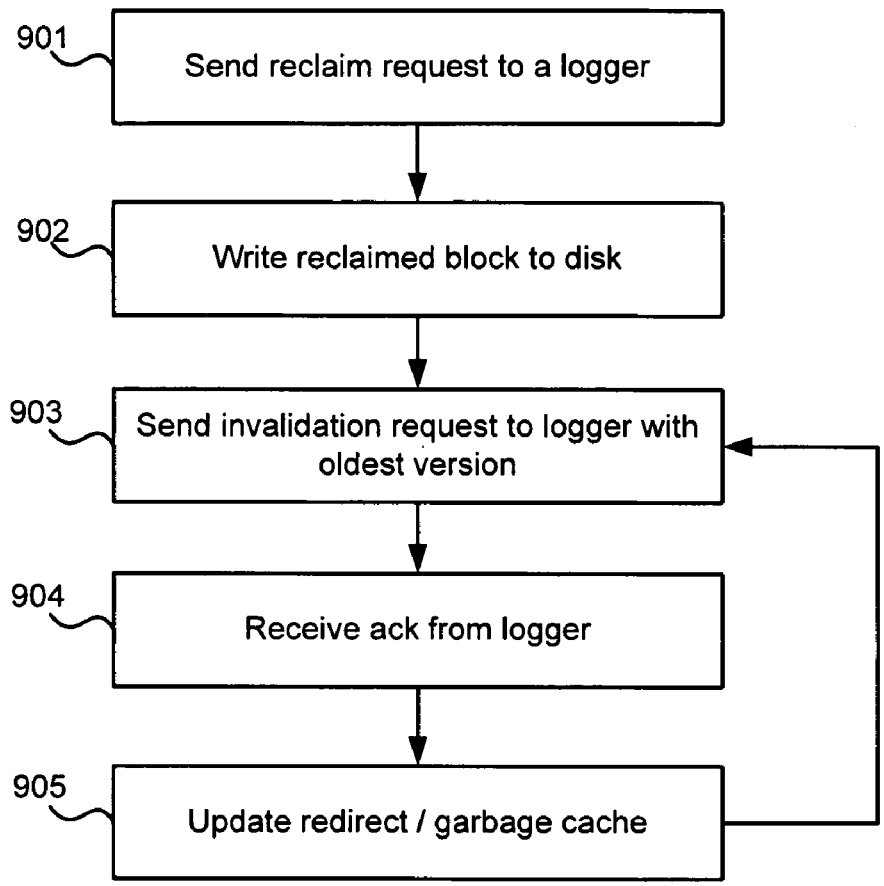

Disk loggers periodically broadcast metrics about their current load levels (or alternatively managers may poll loggers for status data, as shown in FIG. 8). The metrics received are cached by the managers. When the manager wants to choose a logger (or more than one) for writing or reading, it uses this load information to make a selection of loggers. The broadcasts may be relatively infrequent, to avoid overloading the network. In order to get timelier load information where it is needed, these load metrics may also be piggybacked on all the RPC acknowledgements sent by the logger, so that a manager that is actively issuing RPCs is kept up to date. Examples of metrics which may be used include: long term loads on the system, short term loads on the system, disk queue length (either instantaneous or smoothed, aggregated over all I/Os or broken out by reads vs. writes, perhaps counted in I/O operations or in terms of bytes being transferred), diversity of machine configurations, availability of servers, client performance requirements and application behavior (correlated peaks).

Figure 13:
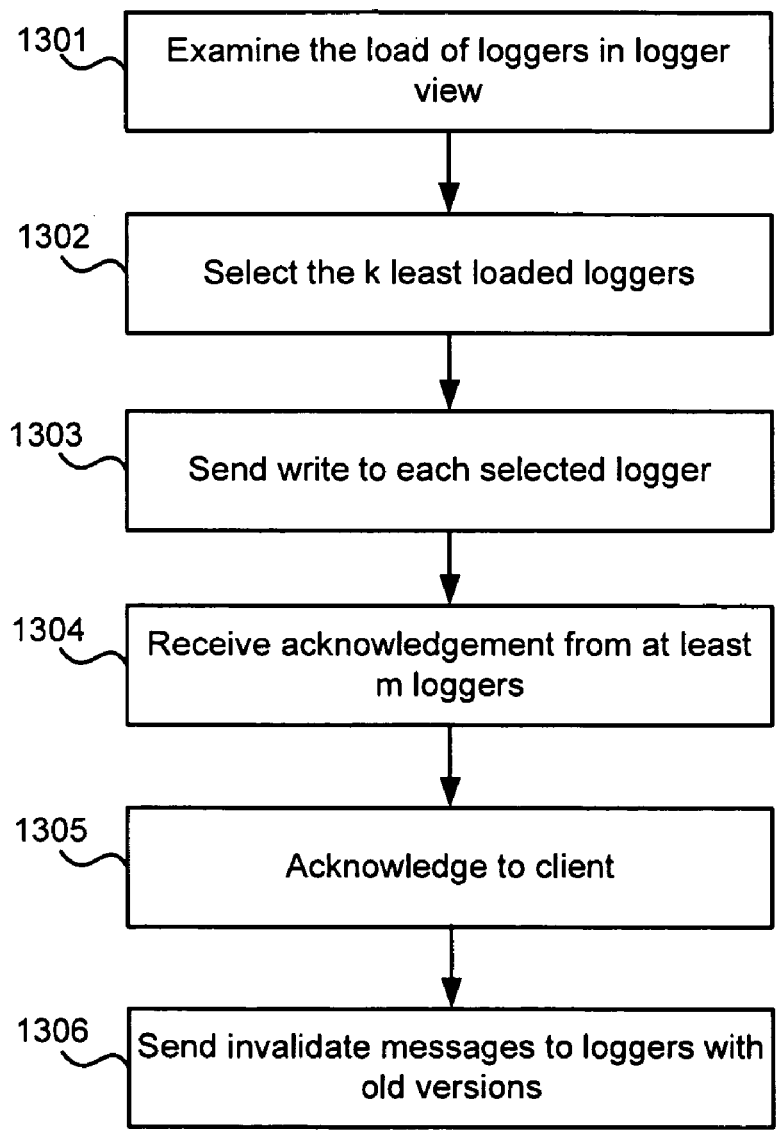
FIGS. 13 and 14 show flow diagrams of further example methods of operation a manager.

The manager may support replication for fault-tolerance and this is also referred to as k-way logging, i.e. each write goes to at least k loggers out of its logger view of size m. The parameters k and m may be configurable, e.g. when the manager is instantiated. The replication may use a protocol as shown in FIG. 13. For each write, the load cache is examined (block 1301) to pick the k least-loaded loggers (1302). The write is sent to all of the selected k loggers (block 1303) and acknowledgements are received from the loggers. When acknowledgements have been received from at least m loggers (block 1304), where $m \leq k$, the write is acknowledged to the client (1305). In the background, messages can be sent to any loggers having old versions (1306) to delete and discard them. In some examples, m=k or m is a fraction of k (e.g. m=0.8 k).

In some examples, in addition to k-way logging (or instead), additional copies may be written to help with load-balancing on reads. These additional copies may be written in main memory using main memory based objectloggers (e.g. like a distributed cache) and may be referred to as 'best effort' replication. In some examples, a larger number of copies than k may be initially written by the manager, expecting m to complete more quickly, and the extra copies eventually downgraded using the 'mark-volatile' flag to get back to the target replication factor k while still providing improved read performance if logger space is available. Different blocks of data, or ranges of bytes, may be replicated in different ways, depending on the importance of the particular piece of data. For example, the value of k may be different for different byte ranges and/or only best effort replication in main memory may be used for some ranges.

Figure 14:
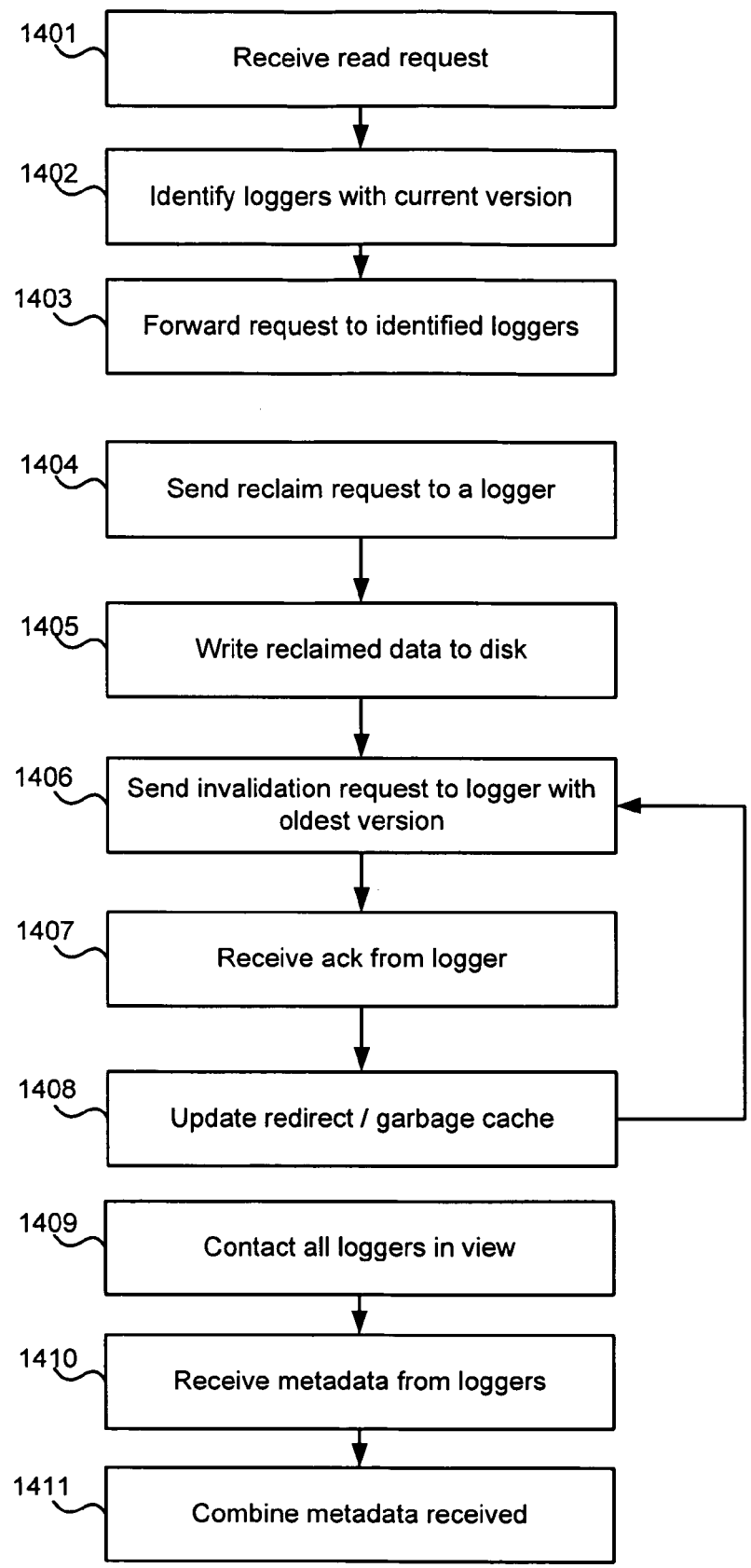

FIG. 14 shows flow diagrams of example methods of operation of a manager. On receipt of a read request (block 1401), the manager identifies loggers with the current version of the data (block 1402). Where a current version is stored on more than one logger, the manager may use data on logger load (as described above) to identify a logger which is most likely to give best performance. Where reads are split across multiple loggers, a request is split into multiple requests. Having identified one or more loggers (in block 1402), the manager forwards the request to the identified loggers (block 1403).

The manager reclaims off-loaded data from loggers in the background (block 1404) and writes the data to the original location (block 1405). After the reclaimed data is written to disk, the manager sends invalidation requests to the appropriate loggers (1406). To ensure correct failure recovery, the latest version of a particular byte range is invalidated only after all older versions (which are in the garbage cache) have been invalidated. Therefore invalidation requests are sent first to the logger with the oldest version (block 1406) and once acknowledged by the logger (block 1407), the redirect/garbage cache can be updated (block 1408). The process (blocks 1406-1408) is repeated until the latest version of a particular byte range (which may be stored in the redirect cache with a flag identifying that it has been written successfully to the original location) has been invalidated. The background reclaim and invalidation ensure that all data will eventually be restored to the original location and that logger space will eventually be freed. In some applications, however, reclaim may not occur and the data may remain in the off-loaded location.

Manager recovery involves contacting all loggers in the logger view, or a quorum of m−k+1 in the case of replication, (block 1409) and getting their in-memory metadata (block 1410), and then combining it (block 1411).

Both the loggers and the manager keep in-memory metadata and the structure may be very similar for both. This metadata identifies where the latest valid version of every byte of every object lives and may be structured as a series of nested 'maps':

client ID→object ID→byte range→<location, version>

The first two steps may be done using hash tables. For mapping byte ranges, a range map may be used (as described above), e.g. which is based on splay trees. This has functionality similar to a hash table but is much more efficient than keeping one hash entry per byte position; instead it keeps one entry per distinct byte range. The 'location' in the case of the logger is the location on disk of the log record containing the bytes. The logger also keeps an in-memory list of all log records containing the disk position and the number of valid bytes currently in the record (for garbage-collection/compaction). The 'location' in the case of the manager is the address of the logger that the data was written to.

An example implementation of a programming model is described in more detail below. The programming model may be event-driven, such that even where there are lots of things going on concurrently; there is only a single thread. The thread is managed by an event scheduler, which fires events in time order. An event is simply a callback function pointer plus a context pointer plus a time. When the callback is invoked it can in turn schedule more events. The idea is that within an event callback function any state can be changed without worrying about race conditions: however blocking calls, as well as any other calls that take a long amount of time, may not be made. The I/O may be implemented using asynchronous calls. For example, when a read or write is called on the logger it needs to do I/O, but it cannot block the read or write call itself, so the completion has to be signaled through a callback.

In this example implementation, all the code running on a given machine runs inside a single 'über-process' with a single event scheduler, and a number of components such as managers, loggers, etc. Each component has an API and an implementation. So for example, the manager and logger components both export the 'objectlogger' API. The 'raw disk' and 'partition' components both export the 'disk' API. These components may be stacked by matching the interfaces, e.g. the logger needs to talk to something with a 'disk' API to store its data; this can be a raw disk or a partition, etc. The code base may be extended by adding a new component API and one or more components that implement it; or by adding a new component that implements an existing API; or by adding functionality to an existing component without changing its external interface.

The stacked model means that components can be hooked together every time the über-process is instantiated. This may be done through a configuration file: the first thing that the über-process does is parse the configuration file, and instantiate components accordingly.

In an example model, the client applications link into the über-process and access loggers etc. through function calls. So for 'legacy' applications that make POSIX or win32 calls a shim layer may be used that translates these into objectlogger calls. Also for threaded applications the shim layer switches between the threaded world and the event world. As a result there may be more than one shim layer, such as: POSIX→win32, and win32+threaded→objectlogger+ events.

A write may be considered 'consistent' when any subsequent read will reflect it, i.e. it is now in the global state (but not necessarily across failures). At some later point it is also durable. With win32, files can be opened for writing in write-back mode, which means the write is consistent when the call returns but only durable when the next FlushFileBuffers( ) call returns. In write-through mode, it is also durable when the write-like call returns; write-like calls are WriteFile( ), WriteFileEx( ) and WriteFileGather( ). Win32 also supports asynchronous I/O: in this case the call 'returns' when the completion callback is posted: at this point the written data is consistent and/or durable. On any write-like call, the shim layer can send it only to an objectlogger (if any); only to an NTFS (NT file system, if any); or to both. On a read-like call it correctly reads from the place(s) which have the latest consistent data; read-like calls are ReadFile( ), ReadFileEx( ) and ReadFileScatter( ).

As an example a shim layer for PostMark is described. PostMark uses the POSIX calls, which is translated by the POSIX-win32 layer into buffered, write-back writes. It is left to the application to call fsync( ) when it needs durability. It is assumed that PostMark has an underlying NTFS file system, and this is augmented with a logger for performance, but the data will reside long-term in the NTFS. The simplest design is: send writes to both NTFS (in buffered, write-back, mode) and to a logger. The write is completed when the NTFS write is completed (i.e. the NTFS has the correct consistent state but not necessarily durable), so reads go to NTFS. When fsync( ) is called however the operation can be completed as soon as all outstanding logger writes for that file are completed.

Using such a shim layer writes will be fast because they are buffered by NTFS, i.e. they do not wait for a disk I/O. Fsync( ) will be fast (or faster than just using NTFS) because the logger has good write performance. Fsync( ) will be correct because the durable state can be recovered by combining the NTFS state with the logger state. Reads will be fast because they will mostly hit in the NTFS buffer cache, and will be correct because the NTFS buffer cache will have the correct consistent state. Either static linking or Detours (for binaries) may be used to introduce the shim layers into a legacy application.

There are many different applications and scenarios where write off-loading may be useful and a number of different examples are described below. For example, database workloads may benefit from this approach. A database server usually has three main I/O activities: writes to the log (aka WAL), reads to fetch data pages from disk and writes to flush dirty data pages to disk. Access to the data pages might contain a substantial amount of random I/O. When the database system becomes I/O bound, write off-loading executes the writes fast, by utilizing any available disks that are idle in the data centre. The mechanism does not hardcode the number of disks to be used opportunistically or the ID of such disks. The number of disks depends on the load presented to the system.

Another example is scientific applications. These usually have phases with extensive I/O activity related to checkpointing their data to persistent storage after a period of CPU computation. For such applications, write off-loading employs many idle disk resources to execute this I/O-intensive phase quickly.

Email server applications, like Microsoft Exchange and Hotmail, could benefit from write off-loading. During peak load, for example in the morning, Microsoft exchange could make use of idle servers that belong to other services to temporarily store incoming email.

Gaming applications, such as Xbox Live, could benefit from write off-loading by employing other services' idle servers during periods of high load. For example, a data centre may host Xbox Live and other services like email or web hosting applications. The Xbox service might transparently and opportunistically utilize the other services' resources to handle its peak loads.

I/O is an issue with video servers. In some video applications, a human editor downloads video clips and creates new video clips. Then, the editor clicks 'save' and waits for a while until the video clip is written to disk. Write-offloading may help here since there is a large amount of data being written.

Figure 15:
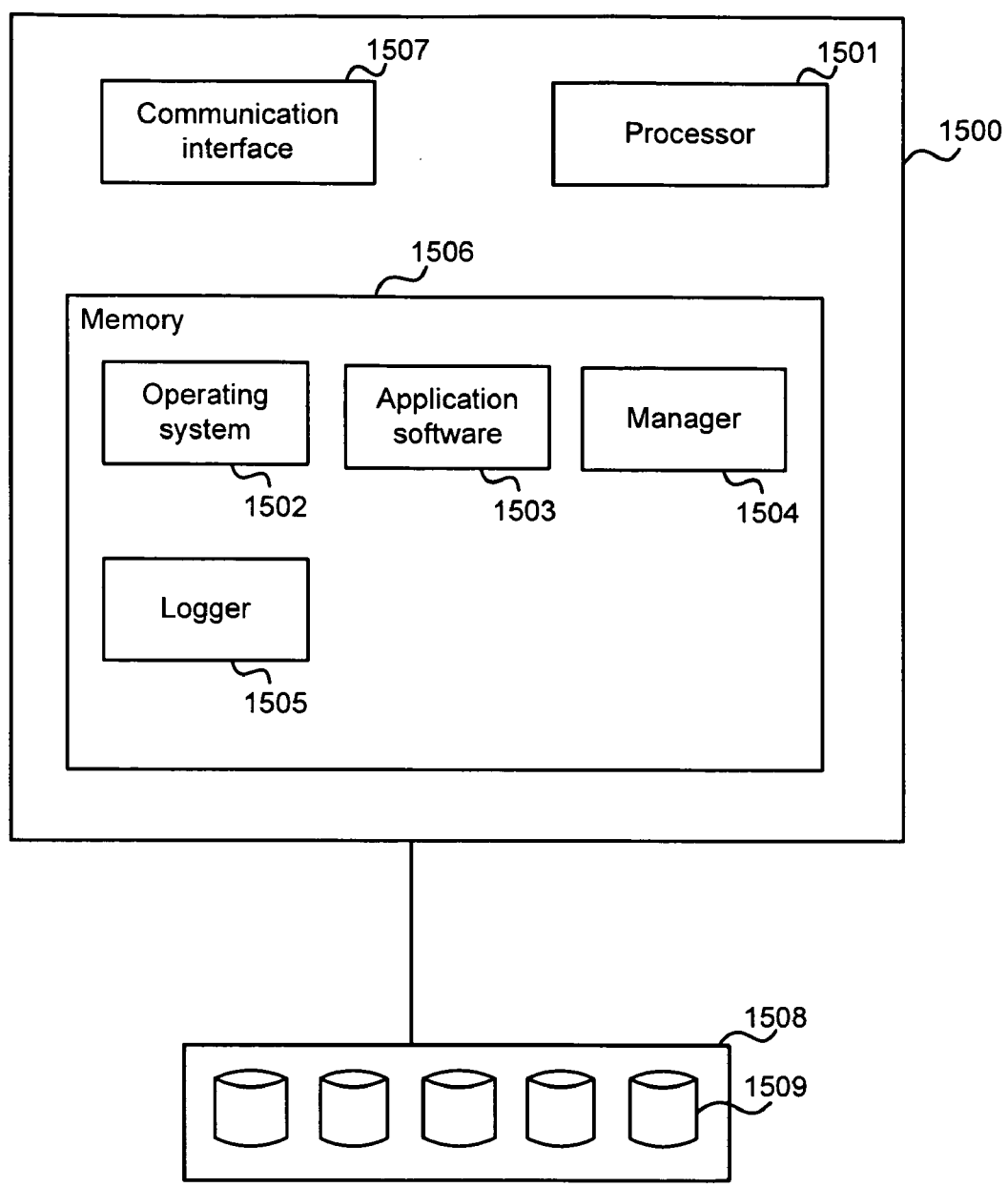
FIG. 15 illustrates an exemplary computing-based device in which embodiments of write off-loading may be implemented.

FIG. 15 illustrates various components of an exemplary computing-based device 1500 which may be implemented as any form of a computing and/or electronic device, and in which embodiments of the methods described herein may be implemented.

Computing-based device 1500 comprises one or more processors 1501 which may be microprocessors, controllers or any other suitable type of processors for processing executable instructions to control the operation of the device in order to perform write off-loading. As described above, a device may act as a manager and/or a logger. Platform software comprising an operating system 1502 or any other suitable platform software may be provided at the computing-based device to enable application software 1503-1505 to be executed on the device. The application software may comprise a manager 1504 and/or a logger 1505 (which may also be referred to as a logger module).

The computer executable instructions may be provided using any computer-readable media, such as memory 1506. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

The computing-based device 1500 further comprises a communication interface 1507 which enables requests to be received from other devices (e.g. applications or other clients and/or managers) and communications to be made with other loggers. The computing-based device 1500 further comprises, or is connected to (e.g. via a network) a storage element 1508. The storage element 1508 may, for example, comprise multiple storage devices 1509.

The computing-based device 1500 may further comprise one or more inputs, for example, which are of any suitable type for receiving media content, Internet Protocol (IP) input, etc and one or more outputs, such as an audio and/or video output to a display system integral with or in communication with the computing-based device.

Although the present examples are described and illustrated herein as being implemented in a data center, the system described is provided as an example and not a limitation. As those skilled in the art will appreciate, the present examples are suitable for application in a variety of different types of storage systems, including for business and non-business applications (e.g. in the home).

The above description refers to write off-loading occurring when a storage device is powered down or overloaded. These are just two examples of situations where the storage device is unavailable and there may be other reasons that the storage device is unavailable which may trigger write off-loading.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls 'dumb' or standard hardware, to carry out the desired functions. It is also intended to encompass software which 'describes' or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of storing data comprising:
   receiving a request from a client to store data on a first storage device;
   determining if defined criteria are met;
   storing a most recent version of the data, if the defined criteria are met, on a second storage device and not on the first storage device by sending a write request to the second storage device, the second storage device comprising a circular log;
maintaining an identity of the second storage device amongst a set of identified storage devices in a hard state data structure;
maintaining logical block numbers for circular log blocks storing the data and a version number of the most recent version of the data in a soft state redirect data structure; and
maintaining locations of older versions of the data in the circular log in a soft state garbage data structure until the older versions are invalidated.

2. A method according to claim 1, wherein determining if defined criteria are met comprises:
determining if the first storage device is powered down.

3. A method according to claim 2, wherein determining if defined criteria are met further comprises:
determining if an older version of at least a portion of the data is stored on the second storage device.

4. A method according to claim 1, wherein determining if defined criteria are met comprises at least one of:
determining if the first storage device is overloaded; and
determining if the first storage location has a higher load than an alternative storage location.

5. A method according to claim 1, wherein storing the data on the second storage device comprises:
selecting a second storage device from the set of identified storage devices based on load metrics for each of the set of identified storage devices;
sending a request to store the data to the second storage devices; and
receiving an acknowledgement from the second storage devices confirming that the data has been stored.

6. A method according to claim 5, further comprising:
selecting at least one other storage devices from the set of identified storage devices based on load metrics for each of the set of identified storage devices; and
sending the request to store the data to each of the selected storage devices.

7. A method according to claim 1, further comprising:
recovering the data from the second storage devices and storing it on the first storage device.

8. A method according to claim 7, further comprising:
sending, to the second storage device, a request to invalidate the most recent version of the data and any older versions of the data.

9. A method according to claim 1, further comprising:
determining if the first storage device is idle; and
powering down the first storage device if the first storage device is idle.

10. A method according to claim 9, further comprising:
powering up the first storage device on receipt of a request from a client to read data stored on the first storage device.

11. A method according to claim 1, further comprising employing the hard state data structure, the soft state redirect data structure, and the soft state garbage data structure to recover the data in an event of a failure.

12. A storage system comprising:
a plurality of storage devices; and
a storage manager, associated with a first storage device from the plurality of storage devices;
a logger module associated with a second storage device, wherein the logger module is arranged to:
receive a write request from the storage manager when the first storage device is unavailable, the write request comprising data and metadata;
store the data and the metadata in the second storage device, the second storage device comprising a circular log including one or more blocks used to store the data and metadata;
maintain a hard state data structure configured to store multiple versions of the same block, at least one version being a most recently written version and at least one version being a stale version; and
maintain a soft state data structure that stores a list of most recently written versions for a plurality of different blocks stored for the storage manager, but does not store details relating to stale versions of the plurality of different blocks.

13. A storage system according to claim 12, wherein the first storage device comprises a volume of disks and wherein the second storage device comprises a partition on a second volume of disks.

14. A storage system according to claim 12, wherein the storage manager is arranged to:
intercept a write request to the first storage device; and
forward the write request to the second storage device.

15. A storage system according to claim 14, wherein forwarding the write request to the second storage device when the first storage device is unavailable comprises at least one of:
forwarding the write request to the second storage device if the first storage device is powered down; or
forwarding the write request to the second storage device if the first storage device is overloaded.

16. A storage system according to claim 12, wherein the soft state data structure enables the logger module to find the most recent version of a block in the circular log.

17. A storage system according to claim 12, wherein the soft state data structure is recreated from the hard state data structure in the event of a failure.

18. One or more tangible device-readable media with device-executable instructions configured to perform acts comprising:
receiving a write request to a storage location, the write request comprising data;
storing a most recent version of the data in the storage location, the storage location comprising a circular log;
maintaining an identity of the storage location amongst a set of identified storage locations in a hard state data structure;
maintaining logical block numbers for circular log blocks storing the data and a version number of the most recent version of the data in a soft state redirect data structure: and maintaining locations of older versions of the data in the circular log in a soft state garbage data structure until the older versions are invalidated.

19. The one or more tangible device-readable media of claim 18, wherein the device-executable instructions are further configured to perform acts comprising:
determining that a first storage location, for which the write request is directed, is unavailable; if the first storage location is unavailable:
selecting the storage location as an alternative when the first storage location is unavailable; and
forwarding the write request to the storage location.

20. The one or more tangible device-readable media of claim 18, wherein the device-executable instructions are further configured to employ the hard state data structure, the soft state redirect data structure, and the soft state garbage data structure to recover the data in an event of a failure.

* * * * *